US010542335B2

(12) United States Patent
Fujisawa et al.

(10) Patent No.: US 10,542,335 B2
(45) Date of Patent: Jan. 21, 2020

(54) OPTICAL NETWORK CONTROLLER AND METHOD OF SETTING OPTICAL PATH

(71) Applicant: NEC CORPORATION, Tokyo (JP)

(72) Inventors: Shinsuke Fujisawa, Tokyo (JP); Akio Tajima, Tokyo (JP); Hitoshi Takeshita, Tokyo (JP); Tomoyuki Hino, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 16/077,136

(22) PCT Filed: Feb. 8, 2017

(86) PCT No.: PCT/JP2017/004507
§ 371 (c)(1),
(2) Date: Aug. 10, 2018

(87) PCT Pub. No.: WO2017/138550
PCT Pub. Date: Aug. 17, 2017

(65) Prior Publication Data
US 2019/0037288 A1 Jan. 31, 2019

(30) Foreign Application Priority Data
Feb. 12, 2016 (JP) ................................ 2016-025100

(51) Int. Cl.
H04J 14/02 (2006.01)
H04Q 11/00 (2006.01)

(52) U.S. Cl.
CPC ..... H04Q 11/0062 (2013.01); H04Q 11/0005 (2013.01); H04Q 2011/0073 (2013.01)

(58) Field of Classification Search
CPC .... H04J 14/02; H04J 14/0227; H04J 14/0293; H04L 45/28; H04L 45/62; H04L 47/10;
(Continued)

(56) References Cited

U.S. PATENT DOCUMENTS 6,885,822 B1 * 4/2005 Chin .................... H04J 14/0227
398/3
6,934,249 B1 * 8/2005 Bertin ..................... H04L 45/00
370/218
(Continued)

FOREIGN PATENT DOCUMENTS

JP 2003-258851 A 9/2003
JP 2007-524263 A 8/2007
(Continued)

OTHER PUBLICATIONS

International Search Report for PCT/JP2017/004507 dated Mar. 28, 2017 (PCT/ISA/210).
(Continued)

Primary Examiner — Tanya T Motsinger
(74) Attorney, Agent, or Firm — Sughrue Mion, PLLC

(57) ABSTRACT

In the elastic optical network, there has been the problem that processing steps increase that are required to re-optimize client signals to be concentrated; therefore, an optical network controller according to an exemplary aspect of the present invention includes reallocation detection means for monitoring an operation status of at least one of an optical communication channel and an optical node device that constitute an optical network, and determining, based on the operation status, whether or not to reallocate a client signal accommodated in an optical path set in the optical network; design-candidate exclusion means for designating, as a design exclusion object, at least one of the optical communication channel and the optical node device that are associated with an optical path targeted for reallocation that accommodates the client signal that the reallocation detection means has determined to reallocate; optical path design means for determining an alternative route for the optical path targeted for reallocation from among routes with the exception of the design exclusion object; traffic reference (Continued)

means for determining the client signal to be reaccommodated in an optical path on the alternative route, referring to demand traffic accommodated in the optical path targeted for reallocation; and line concentration design means for constituting line-concentration traffic in which traffic having been allocated to the alternative route and the demand traffic are concentrated, wherein the traffic reference means determines a reallocation optical path in which an optical path candidate with number of occupied wavelength slots increasing is excluded from optical path candidates on the alternative route, and the optical path design means determines wavelength allocation of the reallocation optical path so as to accommodate the line-concentration traffic.

20 Claims, 19 Drawing Sheets

(58) Field of Classification Search
CPC .............. H04L 47/122; H04L 47/2433; H04Q 2011/0086
See application file for complete search history.

(56) References Cited

U.S. PATENT DOCUMENTS

| | | | |
|---|---|---|---|
| 9,391,694 B2* | 7/2016 | Tochio | H04B 10/032 |
| 9,577,792 B2* | 2/2017 | Kim | H04W 72/0446 |
| 2001/0017722 A1* | 8/2001 | Takachio | H04B 10/271 |
| | | | 398/79 |
| 2002/0033994 A1* | 3/2002 | Chiaroni | H04Q 11/0005 |
| | | | 359/326 |
| 2003/0016414 A1* | 1/2003 | Solheim | H04J 14/0283 |
| | | | 398/82 |
| 2003/0020982 A1* | 1/2003 | Rychlicki | H04J 14/02 |
| | | | 398/79 |
| 2003/0035166 A1* | 2/2003 | Zhang | H04J 14/0227 |
| | | | 398/58 |
| 2003/0065811 A1* | 4/2003 | Lin | H04L 41/0896 |
| | | | 709/232 |
| 2003/0074443 A1* | 4/2003 | Melaku | H04L 12/5692 |
| | | | 709/224 |
| 2003/0090995 A1* | 5/2003 | Illikkal | H04J 3/14 |
| | | | 370/222 |
| 2003/0128774 A1* | 7/2003 | Suzuki | H04L 5/06 |
| | | | 375/316 |
| 2004/0042796 A1* | 3/2004 | Con-Carolis | H04J 14/0227 |
| | | | 398/83 |
| 2004/0228323 A1* | 11/2004 | Acharya | H04L 45/00 |
| | | | 370/351 |
| 2004/0246912 A1* | 12/2004 | Hoang | H04L 45/02 |
| | | | 370/254 |
| 2004/0258409 A1* | 12/2004 | Sadananda | H04L 45/02 |
| | | | 398/50 |
| 2005/0283527 A1* | 12/2005 | Corrado | H04L 45/04 |
| | | | 709/224 |
| 2007/0121507 A1 | 5/2007 | Manzalini et al. | |
| 2013/0195460 A1* | 8/2013 | Kadohata | H04J 14/0257 |
| | | | 398/79 |
| 2013/0279918 A1* | 10/2013 | Mizutani | H04L 12/12 |
| | | | 398/135 |
| 2013/0315580 A1* | 11/2013 | Boertjes | H04J 14/0204 |
| | | | 398/5 |
| 2013/0336116 A1* | 12/2013 | Vasseur | H04L 45/125 |
| | | | 370/235 |
| 2015/0350025 A1* | 12/2015 | Kadohata | H04L 45/62 |
| | | | 370/254 |
| 2016/0119255 A1* | 4/2016 | Luo | H04L 49/557 |
| | | | 370/218 |
| 2017/0295090 A1* | 10/2017 | Gopalan | H04L 45/22 |
| 2018/0367214 A1* | 12/2018 | Woodward | H04B 10/07953 |

FOREIGN PATENT DOCUMENTS

| | | |
|---|---|---|
| JP | 2014-045463 A | 3/2014 |
| WO | 2014/119724 A1 | 1/2017 |

OTHER PUBLICATIONS

Written Opinion of the International Searching Authority for PCT/JP2017/004507 dated Mar. 28, 2017 (PCT/ISA/237).

* cited by examiner

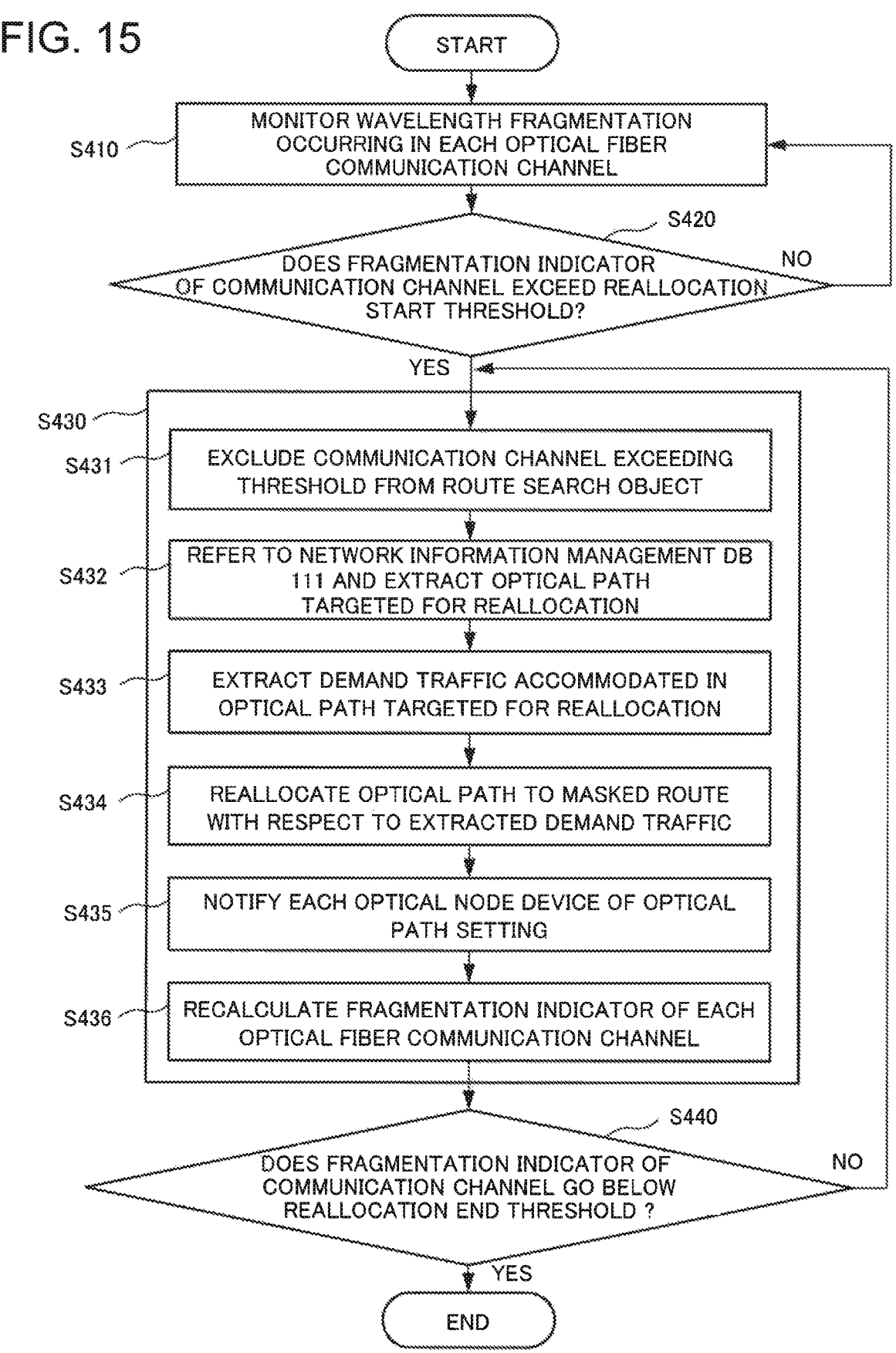

FIG. 16B

| OPTICAL FIBER COMMUNICATION CHANNEL | OCCUPANCY STATE OF WAVELENGTH SLOT | | | | | | | | | | | | | FRAGMENTATION INDICATOR |
|---|---|---|---|---|---|---|---|---|---|---|---|---|---|---|
| 301-1 | OPTICAL PATH A | OPTICAL PATH B | | | | | OPTICAL PATH G | OPTICAL PATH I | | | | | | 0 |
| 301-2 | OPTICAL PATH A | OPTICAL PATH D | OPTICAL PATH E | OPTICAL PATH F | | OPTICAL PATH H | OPTICAL PATH G | OPTICAL PATH L | | OPTICAL PATH K | | | | 1 |
| 301-3 | | OPTICAL PATH D | OPTICAL PATH C | | | | OPTICAL PATH G | OPTICAL PATH L | | | | | | 2 |
| 301-4 | | OPTICAL PATH B | OPTICAL PATH C | | | | OPTICAL PATH J | OPTICAL PATH I | | | | | | 2 |
| 301-5 | | | | OPTICAL PATH E | OPTICAL PATH F | | OPTICAL PATH J | OPTICAL PATH I | | OPTICAL PATH K | | | | 1 |
| 301-6 | | OPTICAL PATH B | | OPTICAL PATH F | | | | OPTICAL PATH H | | OPTICAL PATH K | | | | 1 |

OPTICAL NETWORK CONTROLLER AND METHOD OF SETTING OPTICAL PATH

CROSS REFERENCE TO RELATED APPLICATIONS

This application is a National Stage of International Application No. PCT/JP2017/004507 filed Feb. 8, 2017, claiming priority based on Japanese Patent Application No. 2016-025100, filed Feb. 12, 2016, the disclosure of which is incorporated herein in its entirety by reference.

TECHNICAL FIELD

The present invention relates to optical network controllers and methods of setting an optical path and, in particular, to an optical network controller and a method of setting an optical path that use an elastic optical network scheme.

BACKGROUND ART

An optical network provides the functionality of communicating traffic of a client device through an optical fiber communication channel to establish a connection between hubs. The optical network receives a client signal through an interface between a node device and the client device. A plurality of client signals are multiplexed in a variety of multiplexing schemes, and then the multiplexed client signals are communicated through an optical fiber communication channel having a larger capacity. The multiplexing schemes include a wavelength division multiplexing (WDM) scheme, a time division multiplexing (TDM) scheme and the like.

In such an optical network, a small-granularity switching device such as a switch and a router concentrates a plurality of client signals in accordance with demand traffic of the client device. In order to accommodate the plurality of concentrated client signals with high efficiency in an optical path by which communication is performed through an optical fiber communication channel, a traffic grooming technology is required that is a technology to concentrate a plurality of client signals passing through a common optical fiber communication channel.

Patent Literature 1 discloses an example of such a technology to accommodate a line concentration signal obtained by performing line concentration on a plurality of client signals in a wavelength path of an optical network.

A related path accommodation design apparatus described in Patent Literature 1 is composed of a sub-λ path setting request obtaining section, a design section, a network information management section, and an operation result storage section. The design section includes a logical route determination functional section, a physical route determination functional section, a wavelength use rate computation functional section, a wavelength allocation determination functional section, a sub-λ path accommodation functional section, and an operation rate computation functional section.

The design section accommodates a sub-λ (electric) path in a wavelength path in the following order (priority). That is to say, the design section accommodates the sub-λ path, first, in an existing wavelength path of a single-hop logical route, second, in an existing wavelength path of a multi-hop logical route, third, in a new wavelength path of a single-hop logical route, and fourth, in existing and new wavelength paths of a multi-hop logical route. In this case, if there are a plurality of candidates for the same priority, a candidate having the smallest number of hops for the physical route is selected. If there are a plurality of routes having the same number of hops for the physical route, one of the routes that has the smaller number of hops for the logical route is selected. Furthermore, if there are a plurality of routes having the same number of hops for the logical route, one of the routes that has a smaller wavelength use rate computed by the wavelength use rate computation functional section is selected.

If a redundant path is designed, the logical route determination functional section computes a plurality of candidate logical routes and computes possible combinations between N paths as redundant paths. In this case, each combination is deleted in which the operation rate for the logical route computed by the operation rate computation functional section does not satisfy the quality requirement; alternatively, each combination having node overlapping is deleted.

Next, the physical route determination functional section computes candidate physical routes for the combinations of the computed logical routes. In this process, for each computed logical route that passes a relay node, a route that does not pass the relay node is deleted. In this case, similarly, each combination in which the operation rate does not satisfy the quality requirement is deleted; alternatively, each combination in which the node overlapping, link overlapping, pipeline overlapping, or the like occurs is deleted.

Next, the logical route design functional section computes a logical route that has a free band equal to or wider than the request band and thus has a high accommodation efficiency in the above-mentioned order. The design section then determines whether it is possible to accommodate a sub-λ path in the wavelength path with the computed logical route. If it is determined that the accommodation is possible, the sub-λ path accommodation functional section accommodates the sub-λ path in the wavelength path.

According to the related path accommodation design device, the above-mentioned configuration makes it possible to perform path accommodation design that produces no uneven route arrangement, improve traffic accommodation efficiency, and design highly reliable redundant routes.

On the other hand, in order to use optical frequency resources effectively, an elastic optical network scheme is proposed (see Patent Literature 2, for example). In the elastic optical network scheme, it is possible to allocate a minimum frequency band in accordance with the transmission capacity of an optical signal to a route between the nodes to send and receive an optical signal on a network in which a plurality of nodes are connected by optical fibers. The elastic optical network scheme makes it possible to determine flexibly a frequency band to be allocated by the number of slots using a predetermined frequency width as one slot section.

As described above, according to the elastic optical network scheme, it is possible to change the number of the required wavelength slots of an optical path depending on the required traffic capacity. This makes it possible to allocate an optical path to surplus wavelength resources that cannot be utilized in the conventional fixed grid network; accordingly, it becomes possible to improve the utilization efficiency of the optical network.

CITATION LIST

Patent Literature

PTL 1: WO 2014/119724
PTL 2: Japanese Unexamined Patent Application Publication No. 2014-045463

SUMMARY OF INVENTION

Technical Problem

In the above-mentioned related path accommodation design device and the like, in view of the accommodation efficiency of a physical route and the accommodation efficiency of an optical path to be accommodated, client signals are concentrated so as to accommodate even demand traffic having different destinations in the same optical path, if the same node devices on a physical route connect the optical path.

On the other hand, a recent optical communication network tends toward an increase in having a physical layer topology configuration in which optical node devices are mutually connected by optical fibers in a mesh shape, or a mesh-shaped logical layer topology configuration with optical node devices mutually connected in a ring shape by optical fibers. In the optical communication network having such configurations, for a mesh-shaped physical layer topology, there are many candidates to reselect a route of an optical path and a client signal to be concentrated. Accordingly, in order to improve the accommodation efficiency of the optical path, it is effective to reallocate a demand traffic for line concentration.

However, in the above-mentioned elastic optical network in which it is possible to select the number of required wavelength slots of an optical path, the number of wavelength slots is determined based on communication channel quality of a physical route. Consequently, in reallocating demand traffic to be concentrated, the selection of the number of wavelength slots is added to a search parameter. In addition, in order to improve optical path accommodation efficiency, the selection of a plurality of client signals to be concentrated in accordance with the number of wavelength slots having been selected is added to the search parameter. Therefore, in route conditions that change sequentially, the time required to select client signals to be concentrated further increases.

As described above, in the elastic optical network, there has been the problem that processing steps increase that are required to re-optimize client signals to be concentrated.

The object of the present invention is to provide an optical network controller and a method of setting an optical path that solve the above-mentioned problem that in the elastic optical network, processing steps increase that are required to re-optimize client signals to be concentrated.

Solution to Problem

An optical network controller according to an exemplary aspect of the present invention includes reallocation detection means for monitoring an operation status of at least one of an optical communication channel and an optical node device that constitute an optical network, and determining, based on the operation status, whether or not to reallocate a client signal accommodated in an optical path set in the optical network; design-candidate exclusion means for designating, as a design exclusion object, at least one of the optical communication channel and the optical node device that are associated with an optical path targeted for reallocation that accommodates the client signal that the reallocation detection means has determined to reallocate; optical path design means for determining an alternative route for the optical path targeted for reallocation from among routes with the exception of the design exclusion object; traffic reference means for determining the client signal to be reaccommodated in an optical path on the alternative route, referring to demand traffic accommodated in the optical path targeted for reallocation; and line concentration design means for constituting line-concentration traffic in which traffic having been allocated to the alternative route and the demand traffic are concentrated, wherein the traffic reference means determines a reallocation optical path in which an optical path candidate with number of occupied wavelength slots increasing is excluded from optical path candidates on the alternative route, and the optical path design means determines wavelength allocation of the reallocation optical path so as to accommodate the line-concentration traffic.

A method of setting an optical path according to an exemplary aspect of the present invention includes monitoring an operation status of at least one of an optical communication channel and an optical node device that constitute an optical network, and determining, based on the operation status, whether or not to reallocate a client signal accommodated in an optical path set in the optical network; designating, as a design exclusion object, at least one of the optical communication channel and the optical node device, if it is determined to reallocate the client signal, the optical communication channel and the optical node device being associated with an optical path targeted for reallocation to accommodate the client signal that it is determined to reallocate; determining an alternative route for the optical path targeted for reallocation from among routes with the exception of the design exclusion object; determining the client signal to be reaccommodated in an optical path on the alternative route, referring to demand traffic accommodated in the optical path targeted for reallocation; constituting line-concentration traffic in which traffic having been allocated to the alternative route and the demand traffic are concentrated; determining a reallocation optical path in which an optical path candidate with number of occupied wavelength slots increasing is excluded from optical path candidates on the alternative route; and determining wavelength allocation of the reallocation optical path so as to accommodate the line-concentration traffic.

A program according to an exemplary aspect of the present invention for making a computer function as means for monitoring an operation status of at least one of an optical communication channel and an optical node device that constitute an optical network, and determining, based on the operation status, whether or not to reallocate a client signal accommodated in an optical path set in the optical network; means for designating, as a design exclusion object, at least one of the optical communication channel and the optical node device that are associated with an optical path targeted for reallocation that accommodates the client signal that the reallocation detection means has determined to reallocate; means for determining an alternative route for the optical path targeted for reallocation from among routes with the exception of the design exclusion object; means for determining the client signal to be reaccommodated in an optical path on the alternative route, referring to demand traffic accommodated in the optical path targeted for reallocation; means for constituting line-concentration traffic in which traffic having been allocated to the alternative route and the demand traffic are concentrated, means for determining a reallocation optical path in which an optical path candidate with number of occupied wavelength slots increasing is excluded from optical path candidates on the alternative route; and means for determining wavelength allocation of the reallocation optical path so as to accommodate the line-concentration traffic.

Advantageous Effects of Invention

According to the optical network controller and the method of setting an optical path of the present invention, it is possible to re-optimize client signals to be concentrated and improve the accommodation efficiency of an optical path without increasing processing steps even though the elastic optical network scheme is used.

BRIEF DESCRIPTION OF DRAWINGS

FIG. 15 is a flowchart to explain the operation of an optical network controller according to the fifth example embodiment of the present invention.

FIG. 16B is a diagram to explain the operation of an optical network controller according to the fifth example embodiment of the present invention, and a diagram illustrating an occupancy state of wavelength slots in optical fiber communication channels.

EXAMPLE EMBODIMENT

Example embodiments of the present invention will be described below with reference to the drawings.

First Example Embodiment

Figure 1:
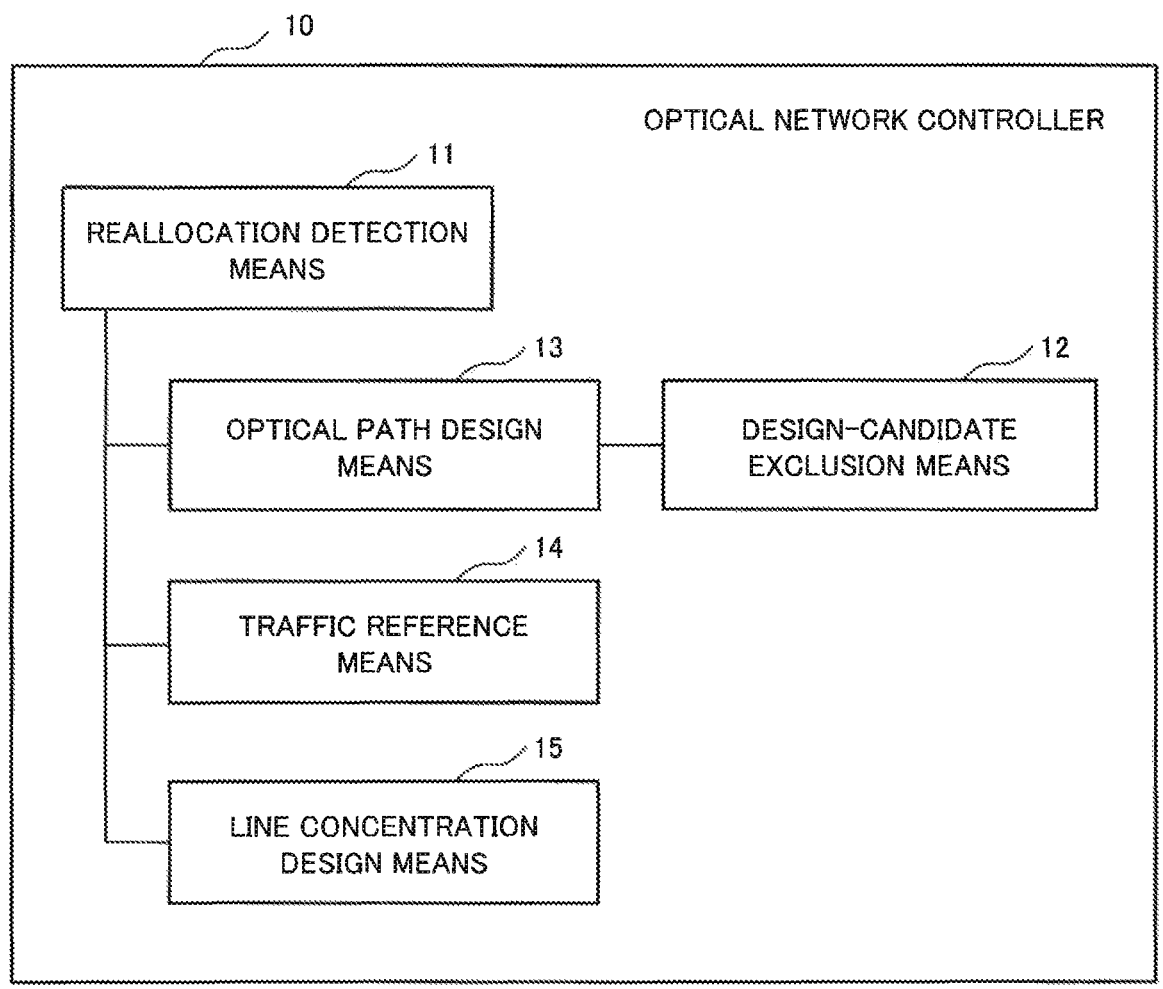
FIG. 1 is a block diagram illustrating a configuration of an optical network controller according to a first example embodiment of the present invention.

FIG. 1 is a block diagram illustrating a configuration of an optical network controller 10 according to a first example embodiment of the present invention. The optical network controller 10 includes a reallocation detection means 11, a design-candidate exclusion means 12, an optical path design means 13, a traffic reference means 14, and a line concentration design means 15.

The reallocation detection means 11 monitors an operation status of at least one of an optical communication channel and an optical node device that constitute an optical network, and determines, based on the operation status, whether or not to reallocate a client signal accommodated in an optical path set in the optical network. The design-candidate exclusion means 12 designates, as a design exclusion object, at least one of the optical communication channel and the optical node device that are associated with an optical path targeted for reallocation that accommodates the client signal that the reallocation detection means 11 has determined to reallocate. The optical path design means 13 determines an alternative route for the optical path targeted for reallocation from among routes with the exception of the design exclusion object.

The traffic reference means 14, referring to the demand traffic accommodated in the optical path targeted for reallocation, determines a client signal to be reaccommodated in an optical path on the alternative route. The line concentration design means 15 constitutes line-concentration traffic in which the traffic having been allocated to the alternative route and the demand traffic are concentrated.

The traffic reference means 14 determines a reallocation optical path in which an optical path candidate with the number of occupied wavelength slots increasing is excluded from optical path candidates on the alternative route. The optical path design means 13 determines wavelength allocation of the reallocation optical path so as to accommodate the line-concentration traffic.

As mentioned above, in the optical network controller 10 according to the present example embodiment, the traffic reference means 14 is configured to determine the reallocation optical path in which the optical path candidate with the number of occupied wavelength slots increasing is excluded from the optical path candidates on the alternative route. Therefore, according to the optical network controller 10 according to the present example embodiment, it is possible to re-optimize client signals to be concentrated and improve the accommodation efficiency of an optical path without increasing processing steps even though the elastic optical network scheme is used.

The reallocation detection means 11 can be configured to include a wavelength utilization rate calculation means that monitors a wavelength utilization rate of an optical communication channel as an operation status. This makes it possible to untie tight conditions of available wavelengths in the optical communication channel.

Next, a method of setting an optical path according to the present example embodiment will be described. In the method of setting an optical path according to the present example embodiment, first, an operation status of at least one of an optical communication channel and an optical node device that constitute an optical network is monitored, and it is determined, based on the operation status, whether or not to reallocate a client signal accommodated in an optical path set in the optical network. If it is determined to reallocate the client signal, at least one of an optical communication channel and an optical node device is designated as a design exclusion object. The optical communication channel and the optical node device are associated with an optical path targeted for reallocation to accommodate the client signal that it is determined to reallocate. From among routes with the exception of the design exclusion object, an alternative route for the optical path targeted for reallocation is determined.

Subsequently, referring to the demand traffic accommodated in the optical path targeted for reallocation, a client signal to be reaccommodated in an optical path on the alternative route is determined. Then line-concentration traffic is constituted in which the traffic having been allocated to the alternative route and the demand traffic are concentrated.

A reallocation optical path is determined in which an optical path candidate with the number of occupied wavelength slots increasing is excluded from optical path candidates on the alternative route. Then wavelength allocation of the reallocation optical path is determined so as to accommodate the above-mentioned line-concentration traffic.

The above-mentioned each step may be performed by a computer. That is to say, it is possible to use a program that allows a computer to function as the following first means to seventh means.

The first means is to monitor an operation status of at least one of an optical communication channel and an optical node device that constitute an optical network, and determines, based on the operation status, whether or not to reallocate a client signal accommodated in an optical path set in the optical network. The second means is to designate, as a design exclusion object, at least one of the optical communication channel and the optical node device that are associated with an optical path targeted for reallocation to accommodates the client signal that it is determined to reallocate if it is determined to reallocate the client signal. The third means is to determine an alternative route for the optical path targeted for reallocation from among routes with the exception of the design exclusion object. The fourth means is to determine a client signal to be reaccommodated in an optical path on the alternative route, referring to the demand traffic accommodated in the optical path targeted for reallocation. The fifth means is to constitute line-concentration traffic in which the traffic having been allocated to the alternative route and the demand traffic are concentrated. The sixth means is to determine a reallocation optical path in which an optical path candidate with the number of occupied wavelength slots increasing is excluded from optical path candidates on the alternative route. The seventh means is to determine wavelength allocation of the reallocation optical path so as to accommodate the line-concentration traffic.

As mentioned above, according to the optical network controller 10, the method of setting an optical path, and the program of the present example embodiment, it is possible to re-optimize client signals to be concentrated and improve the accommodation efficiency of an optical path. In this case, even though the elastic optical network scheme is used, there is no increase in processing steps.

Second Example Embodiment

Figure 2:
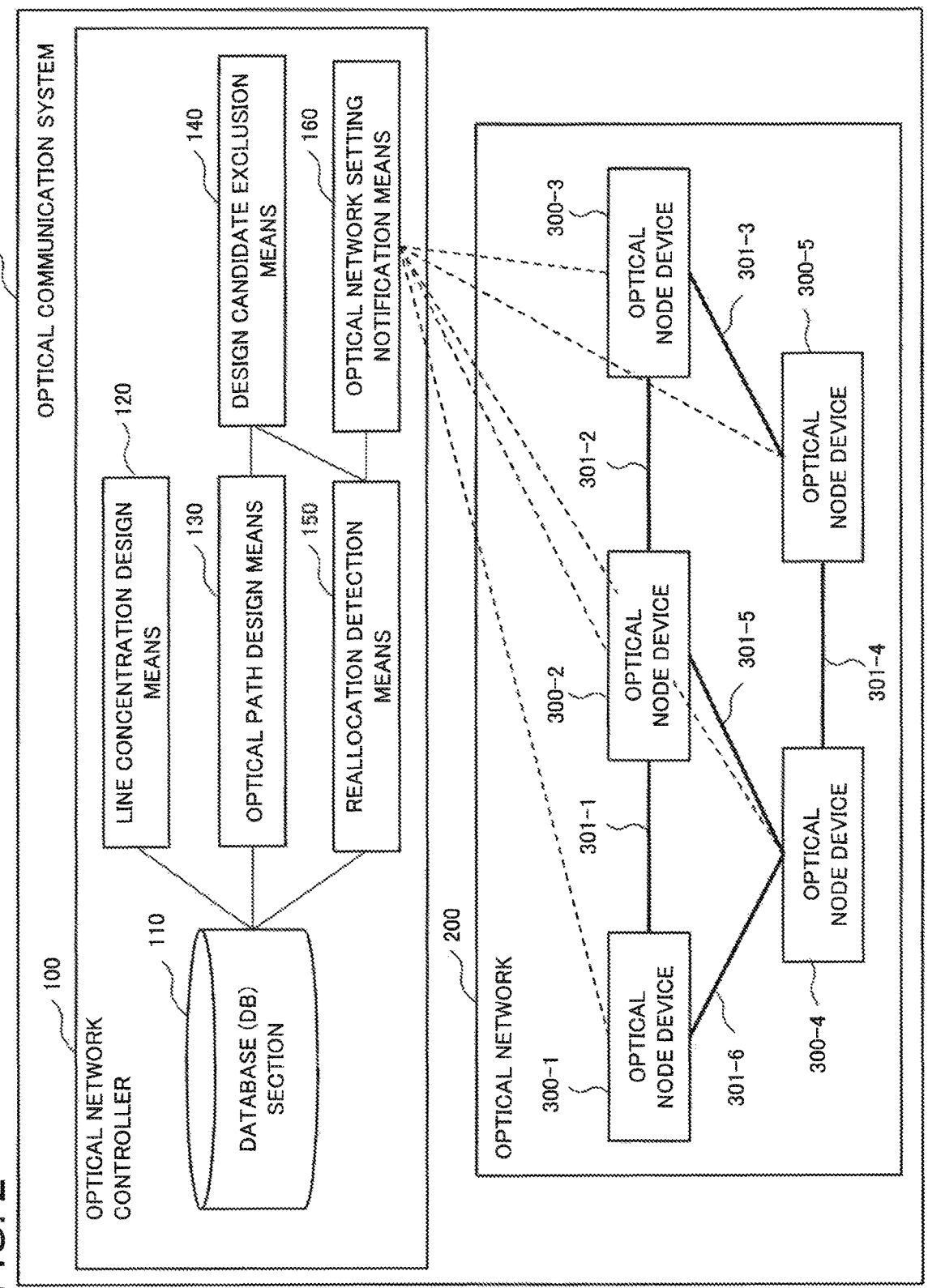
FIG. 2 is a block diagram illustrating a configuration of an optical communication system according to a second example embodiment of the present invention.

Next, a second example embodiment of the present invention will be described. FIG. 2 illustrates a configuration of an optical communication system 1000 according to the present example embodiment. As illustrated in the diagram, the optical communication system 1000 includes an optical network controller 100 and an optical network 200. The optical network 200 is composed of optical node devices 300-1 to 300-5 and optical fiber communication channels 301-1 to 301-6. FIG. 2 illustrates an example of the optical network 200 that is composed of five optical node devices 300-1 to 300-5 connected to each other through six optical fiber communication channels 301-1 to 301-6.

Figure 3:
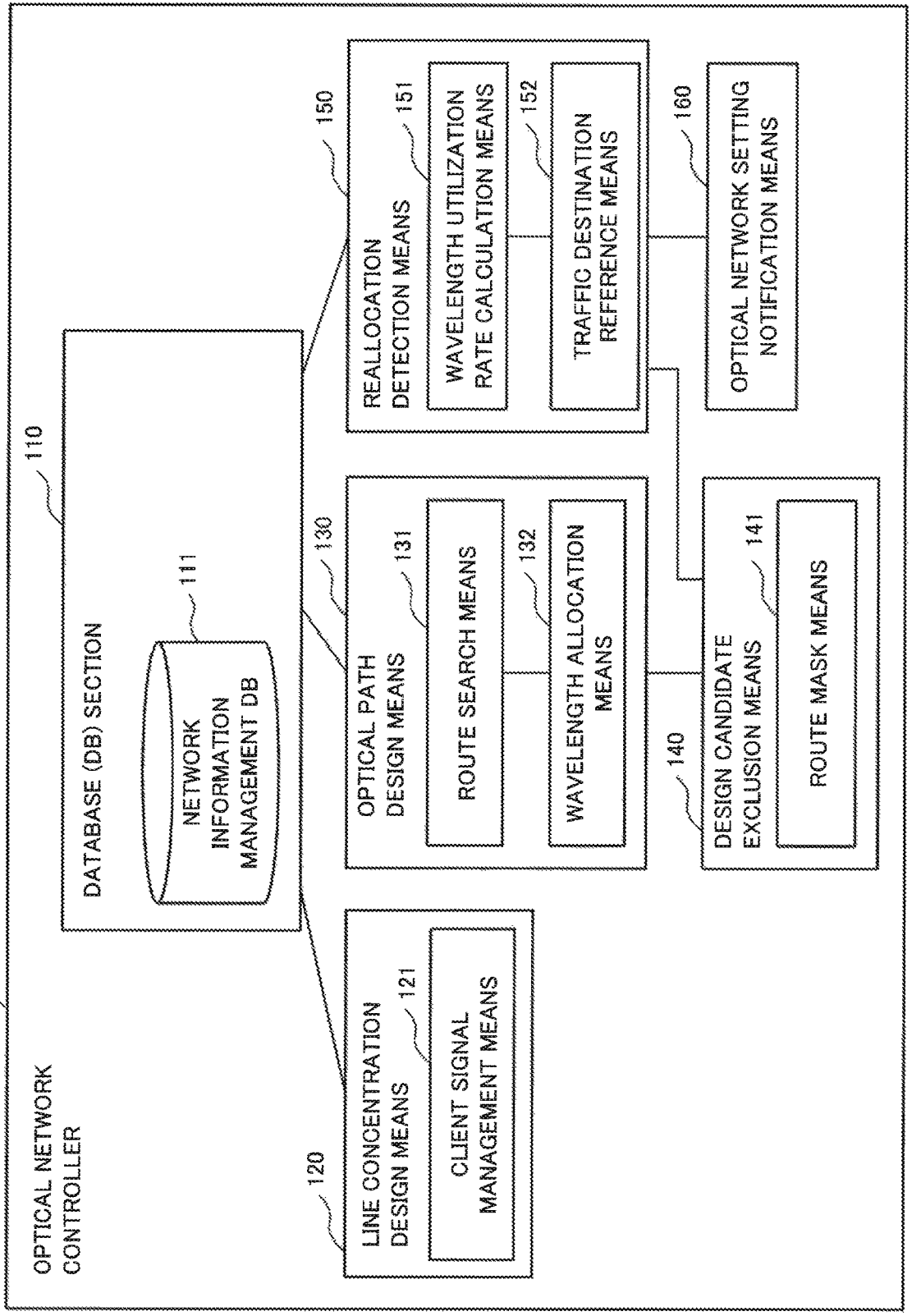
FIG. 3 is a block diagram illustrating a configuration of an optical network controller according to the second example embodiment of the present invention.

FIG. 3 illustrates a configuration of the optical network controller 100 according to the present example embodiment. The optical network controller 100 includes a database section 110, a line concentration design means (a line concentration design section) 120, an optical path design means (an optical path design section) 130, a design candidate exclusion means (a design candidate exclusion section) 140, a reallocation detection means (a reallocation detection section) 150, and an optical network setting notification means (an optical network setting notification section) 160.

The database (DB) section 110 includes a network information management database (DB) 111. The line concentration design means 120 includes a client signal management means (a client signal management section) 121. The optical path design means 130 includes a route search means (a route search section) 131 and a wavelength allocation means (a wavelength allocation section) 132. The design candidate exclusion means 140 include a route mask means (a route mask section) 141. The reallocation detection means 150 includes a wavelength utilization rate calculation means (a wavelength utilization rate calculation section) 151 and a traffic destination reference means (a traffic destination reference section) 152.

Figure 4:
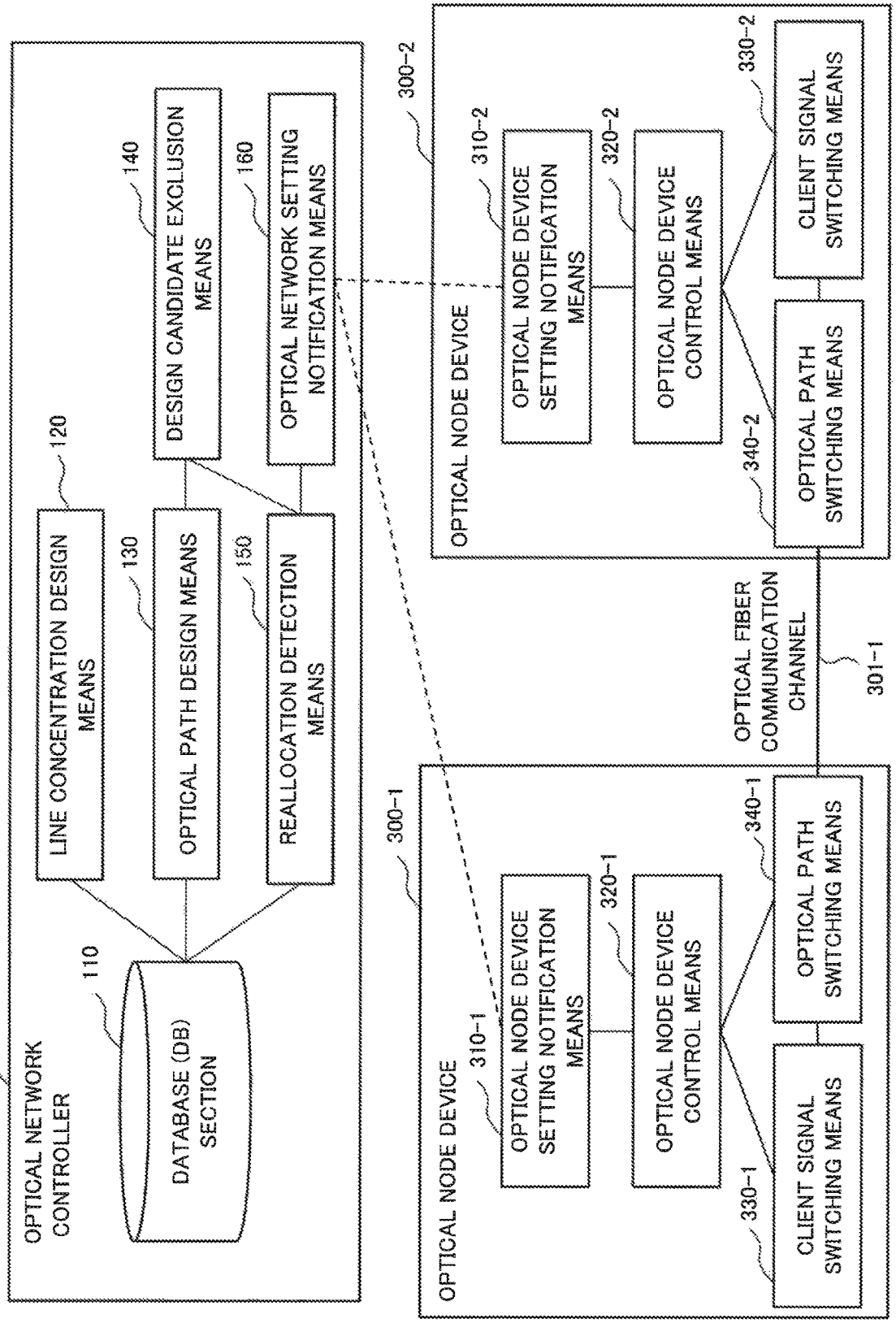
FIG. 4 is a block diagram illustrating the relation of connection between an optical network controller and an optical node device in an optical communication system according to the second example embodiment of the present invention.

FIG. 4 schematically illustrates a relation of connection between the optical network controller 100 and optical node devices in the optical communication system 1000 of the present example embodiment. FIG. 4 illustrates an example where two optical node devices 300-1 and 300-2 are connected.

Each of the optical node devices 300-1 and 300-2 includes an optical node device setting notification means (an optical node device setting notification section) 310, an optical node device control means (an optical node device control section) 320, a client signal switching means (a client signal switching section) 330, and an optical path switching means (an optical path switching section) 340. As illustrated in FIG. 4, the optical network setting notification means 160 included in the optical network controller 100 is connected to the optical node device setting notification means 310-1 and 310-2 included in the optical node devices 300-1 and 300-2, respectively. The optical node devices 300-1 and 300-2 are connected to each other through an optical fiber communication channel 301-1 between the optical path switching means 340-1 and 340-2 respectively included in the optical node devices 300-1 and 300-2.

Figure 5:
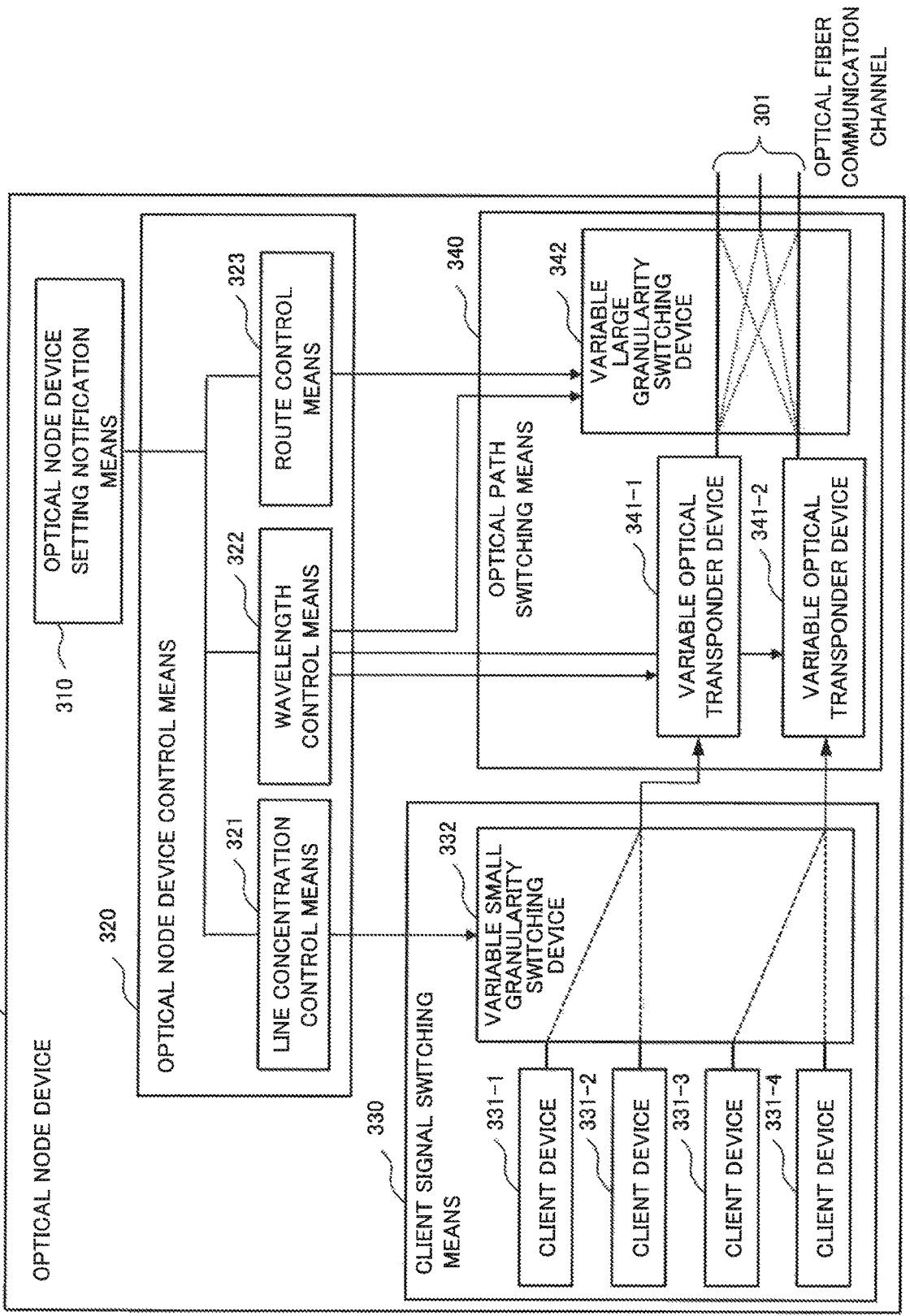
FIG. 5 is a block diagram illustrating a configuration of an optical node device according to the second example embodiment of the present invention.

FIG. 5 illustrates a further detailed configuration of the optical node device 300. As illustrated in FIG. 5, the optical node device control means 320 in the optical node device 300 includes a line concentration control means (a line concentration control section) 321, a wavelength control means (a wavelength control section) 322, and a route control means (a route control section) 323.

The client signal switching means 330 in the optical node device 300 includes client devices 331-1 to 331-4 and a variable small-granularity switching device 332. The optical path switching means 340 includes variable optical transponder devices 341-1 and 341-2 and a variable large-granularity switching device 342. As the variable small-granularity switching device 332, it is possible to use a switch, a router, an open flow switch and the like, for example. As the variable large-granularity switching device 342, it is possible to use an optical cross-connect, a variable-band wavelength selective switch and the like, for example.

Figure 6:
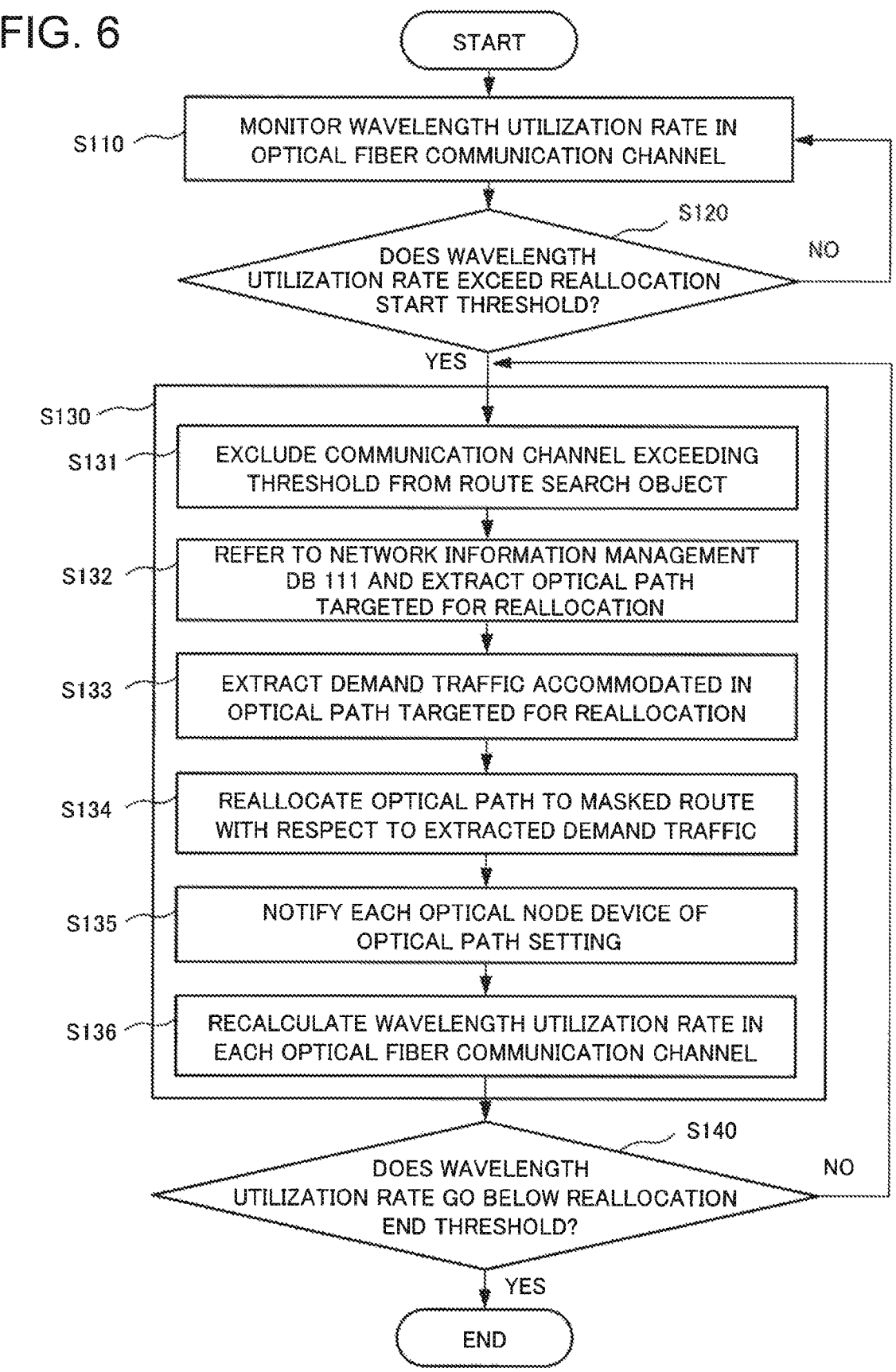
FIG. 6 is a flowchart to explain the operation of an optical network controller according to the second example embodiment of the present invention.

Next, the operation of the optical network controller 100 according to the present example embodiment will be described. FIG. 6 is a flowchart to explain the operation of the optical network controller 100 according to the present example embodiment.

Figure 7:
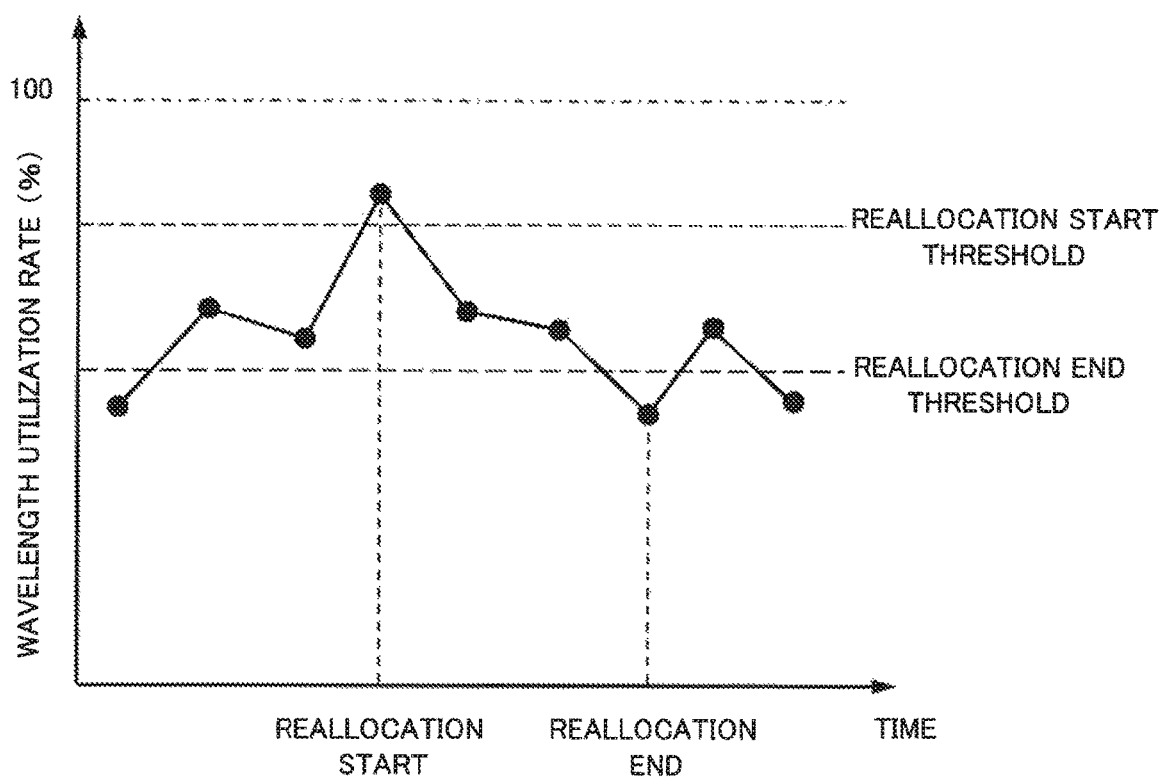
FIG. 7 is a diagram to explain the operation of an optical network controller according to the second example embodiment of the present invention, and a diagram schematically illustrating a time variation in a wavelength utilization rate in an optical fiber communication channel.

The wavelength utilization rate calculation means 151 included in the optical network controller 100 monitors wavelength utilization rates in the optical fiber communication channels 301-1 to 301-6 constituting the optical network 200, regularly or at a timing when an optical path is allocated (step S110). The wavelength utilization rate is the ratio of the number of wavelength slots having accommodated traffic to the number of all wavelength slots in the optical fiber communication channels. FIG. 7 schematically illustrates a time variation in the wavelength utilization rate in the optical fiber communication channel.

The optical network controller 100 determines whether the wavelength utilization rate in the optical fiber communication channel exceeds a reallocation start threshold (step S120). The reallocation start threshold can be set in advance by a network operator and the like of telecommunications carriers, for example. If the wavelength utilization rate in the optical fiber communication channel exceeds the reallocation start threshold (step S120/YES), the optical network controller 100 implements a reallocation process of demand traffic (step S130).

The reallocation process of demand traffic (step S130) is implemented by the following procedure.

The route mask means 141 masks an optical fiber communication channel that exceeds the reallocation start threshold, and excludes it from a route search object (step S131). Next, referring to the network information management database (DB) 111, an optical path is extracted that has been allocated to the optical fiber communication channel excluded from the route search object (step S132). The extracted optical path is called an "optical path targeted for reallocation".

The traffic destination reference means 152 extracts the demand traffic accommodated in the optical path targeted for reallocation (step S133). The optical path design means 130 performs a calculation to reallocate an optical path to a route from which the optical fiber communication channel exceeding the reallocation start threshold is masked and excluded, with respect to the extracted demand traffic (step S134). As algorithms used in this case, there are a linear programming method, a k-th shortest path search method and the like.

Based on the above-mentioned calculation results, an optical path is excluded of which the number of occupied wavelength slots will increase, and then reallocation is performed. The reallocation can be performed on a first-come-first-served basis. The sequence is not limited to this, and the preprocessing to rearrange appropriately the reallocation order may be implemented depending on a physical route length, the number of hops of a physical route, the quality of a physical route, a frequency usage efficiency of an optical path, traffic priority and the like.

The reallocation design results of the optical path are sent from the optical network setting notification means 160 to each optical node device 300 through the optical node device setting notification means 310 included in each optical node device 300, and the results are reflected (step S135).

Figure 8A:
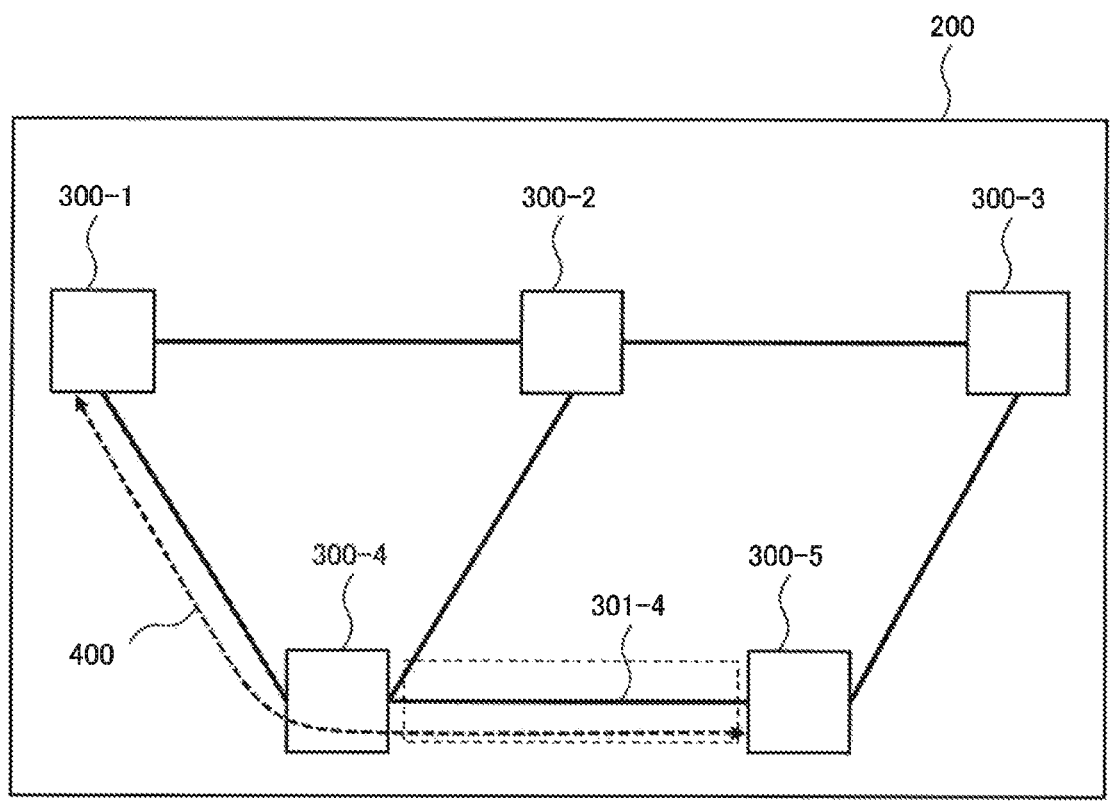
FIG. 8A is a diagram to explain the operation of an optical network controller according to the second example embodiment of the present invention, and a diagram illustrating a state where an optical fiber communication channel is masked in which a wavelength utilization rate exceeds a reallocation start threshold.
Figure 8B:
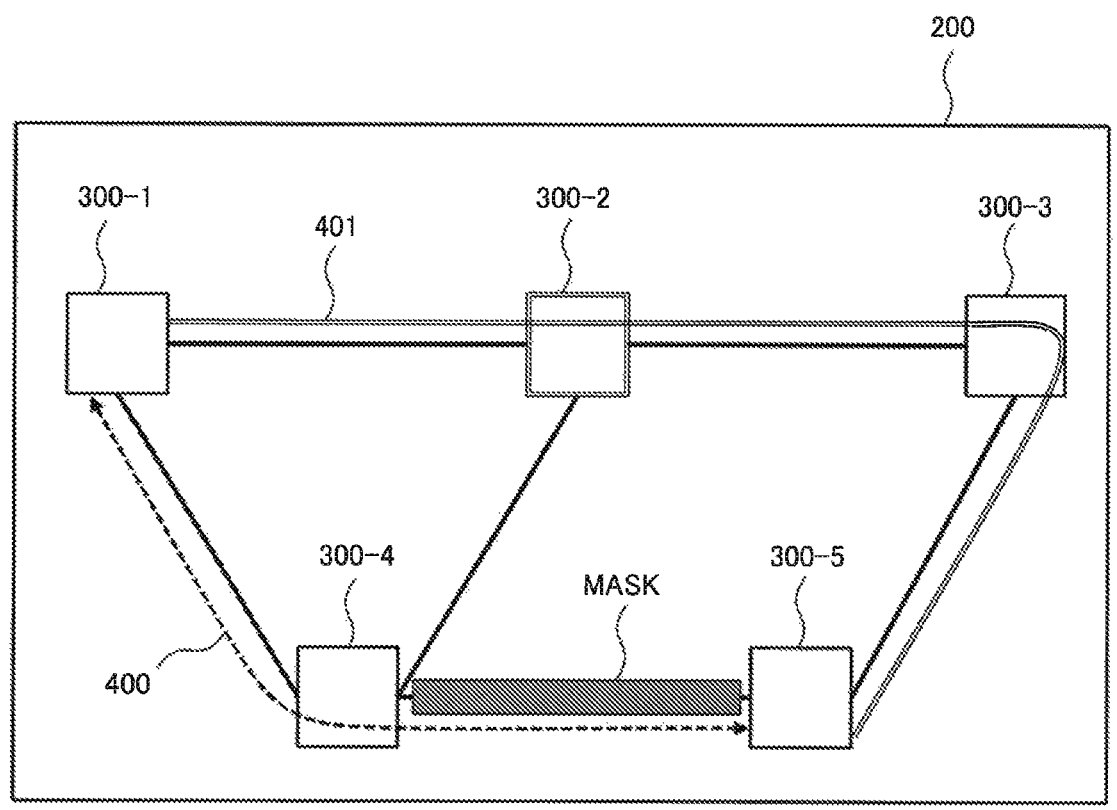
FIG. 8B is a diagram to explain the operation of an optical network controller according to the second example embodiment of the present invention, and a diagram illustrating a state after searching for an alternative route and an optical node device to concentrate lines.

Next, the operation for the optical network controller 100 to reallocate demand traffic will be described using the cases illustrated in FIG. 8A to FIG. 8C as examples.

The wavelength utilization rate calculation means 151 included in the optical network controller 100 detects the fact that a wavelength utilization rate in the optical fiber communication channel 301-4 exceeds a reallocation start threshold. Then the route mask means 141 masks the optical fiber communication channel 301-4 and excludes it from the route search object (FIG. 8A).

The traffic destination reference means 152 searches for an alternative route used for a case where the demand traffic 400 accommodated in the extracted optical path targeted for reallocation is reallocated to the route from which the masked optical fiber communication channel 301-4 has been excluded. In this case, the client signal management means 121 sets a plurality of client signals that the optical node device 300-2 concentrates, in order to concentrate the other multiple demands of traffic to be allocated to an alternative route 401 (FIG. 8B).

Figure 8C:
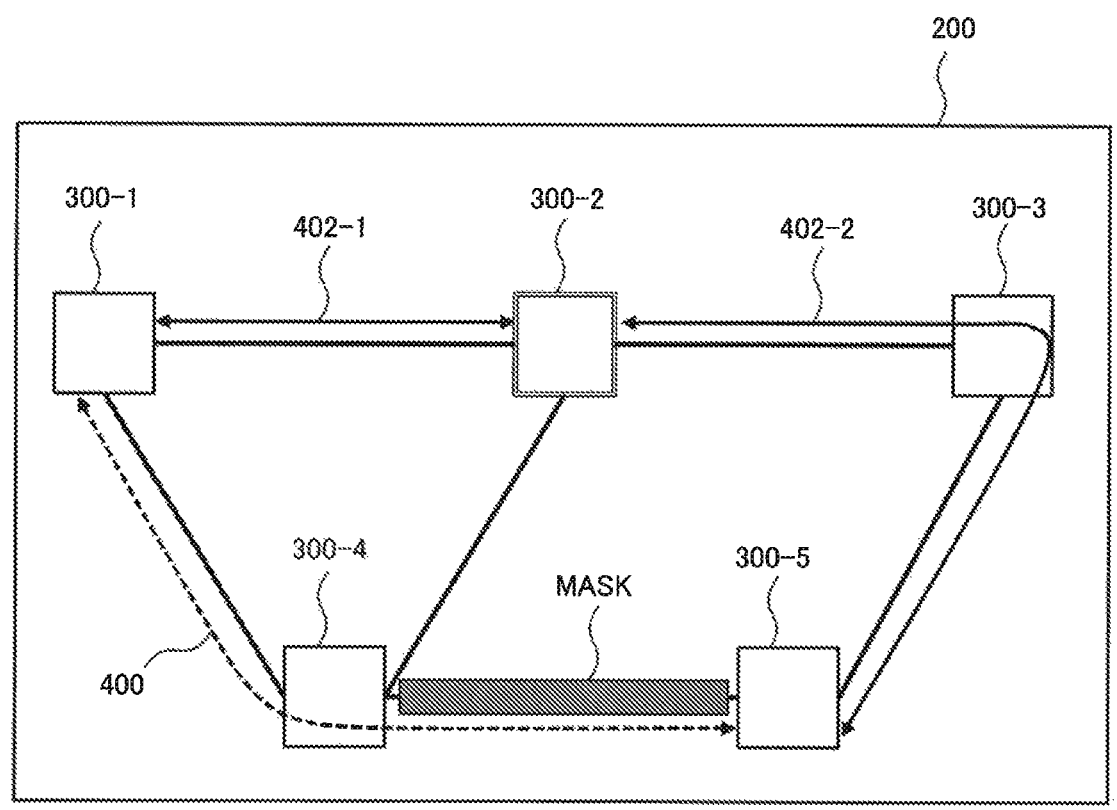
FIG. 8C is a diagram to explain the operation of an optical network controller according to the second example embodiment of the present invention, and a diagram illustrating a state after setting an optical path to accommodate demand traffic.

The optical path design means 130 designs optical paths 402-1 and 402-2 that accommodate the demand traffic 400 (FIG. 8C).

The above processes have completed the reallocation of the optical path.

After the above-mentioned optical path reallocation setting is reflected, the wavelength utilization rate calculation means 151 calculates again a wavelength utilization rate in each optical fiber communication channel (step S136 in FIG. 6). It is determined whether the wavelength utilization rate in each optical fiber communication channel goes below a reallocation end threshold (step S140). If the wavelength utilization rate does not go below the reallocation end threshold (step S140/NO), the reallocation process (step S130) is performed repeatedly. If the wavelength utilization rate goes below the reallocation end threshold (step S140/YES), the reallocation process of the optical path is finished (see FIG. 7). The reallocation end threshold can be set in advance by a network operator and the like of telecommunications carriers, for example.

With an increase in the demand traffic volume accommodated in the entire optical network, a proportion of optical fiber communication channels exceeding the reallocation start threshold increases. This causes many more optical fiber communication channels to be excluded from the route search object in step S131; consequently, it is likely to fail in the route search. In this case, the reallocation start threshold and the reallocation end threshold can be set again depending on the average of the wavelength utilization rates of the entire optical network, for example. The reallocation start threshold is set again, which increases the number of optical fiber communication channels to be route search objects; therefore, it is possible to improve a success rate of the route selection.

For an optical path requiring being always opened, such as an optical path with high priority, the wavelength utilization rate may be used as a route search metric in failing in route search, and the optical path may be allocated to a route at which the wavelength utilization rate is minimized.

For an optical path with high priority, in order to avoid disruption of communications due to optical path reallocation, the optical path with high priority may be excluded from an object to be reallocated even though the wavelength utilization rate exceeds the threshold. In this case, it is only necessary to extract only an optical path with priority below a constant value from the network information management database (DB) 111 and use it as an object to be reallocated. The priority of the optical path can be determined by a network operator of telecommunications carriers, for example.

In the optical node device 300, the optical node device control means 320 controls the client signal switching means 330 and the optical path switching means 340 based on the setting that the optical node device setting notification means 310 has received, and reallocates an optical path. Specifically, as illustrated in FIG. 5, the line concentration control means 321 included in the optical node device control means 320 notifies the variable small-granularity switching device 332 of a line-concentration object of a client signal sent from each of the client devices 331-1 to 331-4 and a destination of a concentrated client signal. The wavelength control means 322 notifies the variable optical transponder devices 341-1 and 341-2 of a wavelength slot number representing an allocation of an optical path, a modulation scheme, and a spectrum shaping setting value. The variable optical transponder devices 341-1 and 341-2 set a wavelength slot, a modulation scheme, and spectrum shaping of signal light, based on the notification. The variable large-granularity switching device 342 switches a destination to an alternative route to which a reallocation optical path is allocated, based on the notification of the wavelength slot number received from the wavelength control means 322 and the notification of the route setting received from the route control means 323.

With respect to demand traffic for which instantaneous interruption of communication is not permitted, it is possible to achieve the reallocation of an optical path without instantaneous interruption by performing the process of deleting an original optical path after a reallocation optical path is established, a so-called Make before Break process.

The above-mentioned operation of the optical network controller 100 makes it possible to untie tight conditions of available wavelengths in the optical fiber communication channel.

As mentioned above, the optical network controller 100 according to the present example embodiment excludes an optical path of which the number of occupied wavelength slots increases due to the reallocation and then performs optical path reallocation. That is to say, the optical network controller 100 performs the re-optimization of optical path allocation with respect to only an optical path that enables the utilization efficiency of the optical network to improve. This makes it possible to reduce processing time and processing steps required for the re-optimization of the optical path allocation. This is because the calculation amount of the operation to extract an optical path to be reselected and a line-concentration client signal is significantly smaller than the calculation amount of a client signal in the line concentration design means.

As a result, it is possible to re-optimize client signals to be concentrated and improve the accommodation efficiency of an optical path without increasing processing steps even though the elastic optical network scheme is used.

Because the switching process of an optical path is performed on only an optical path targeted for reallocation, it is possible to suppress minimally a risk that a communication interruption occurs during the process. That is to say, it is possible to improve network utilization efficiency at high speed without detracting from reliability of the network.

Third Example Embodiment

Figure 9:
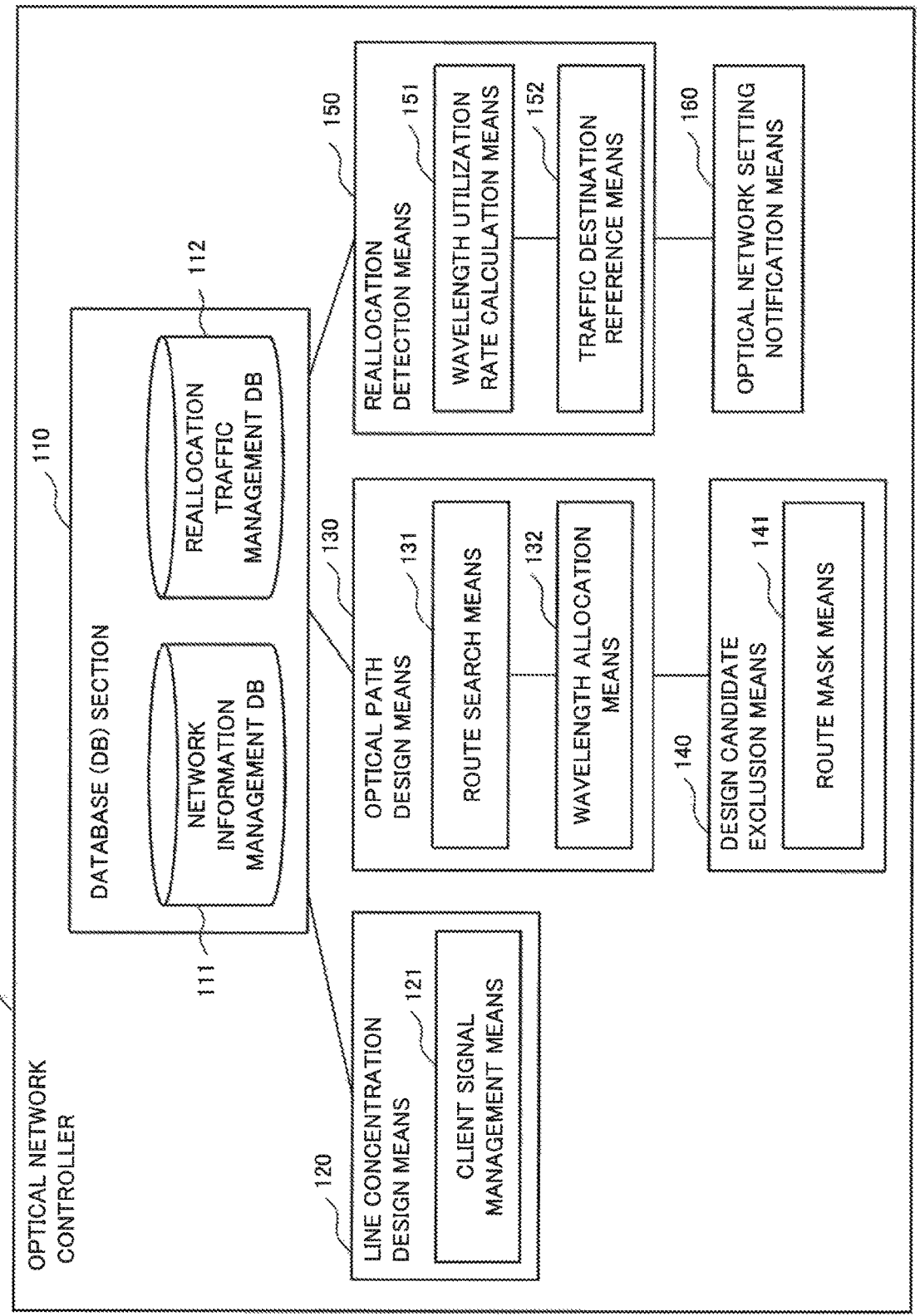
FIG. 9 is a block diagram illustrating a configuration of an optical network controller according to a third example embodiment of the present invention.

Next, a third example embodiment of the present invention will be described. FIG. 9 illustrates a configuration of an optical network controller 101 according to the present example embodiment.

The optical network controller 101 includes the database section 110, the line concentration design means (the concentration design section) 120, the optical path design means (the optical path design section) 130, the design candidate exclusion means (the design candidate exclusion section) 140, the reallocation detection means (the reallocation detection section) 150, and the optical network setting notification means (the optical network setting notification) 160. The database (DB) section 110 includes a reallocation traffic management database (DB) 112 in addition to the network information management database (DB) 111. The configurations except the reallocation traffic management database (DB) 112 are similar to those of the optical network controller 100 according to the second example embodiment; consequently, their detailed descriptions may not be repeated in the following description.

Figure 10:
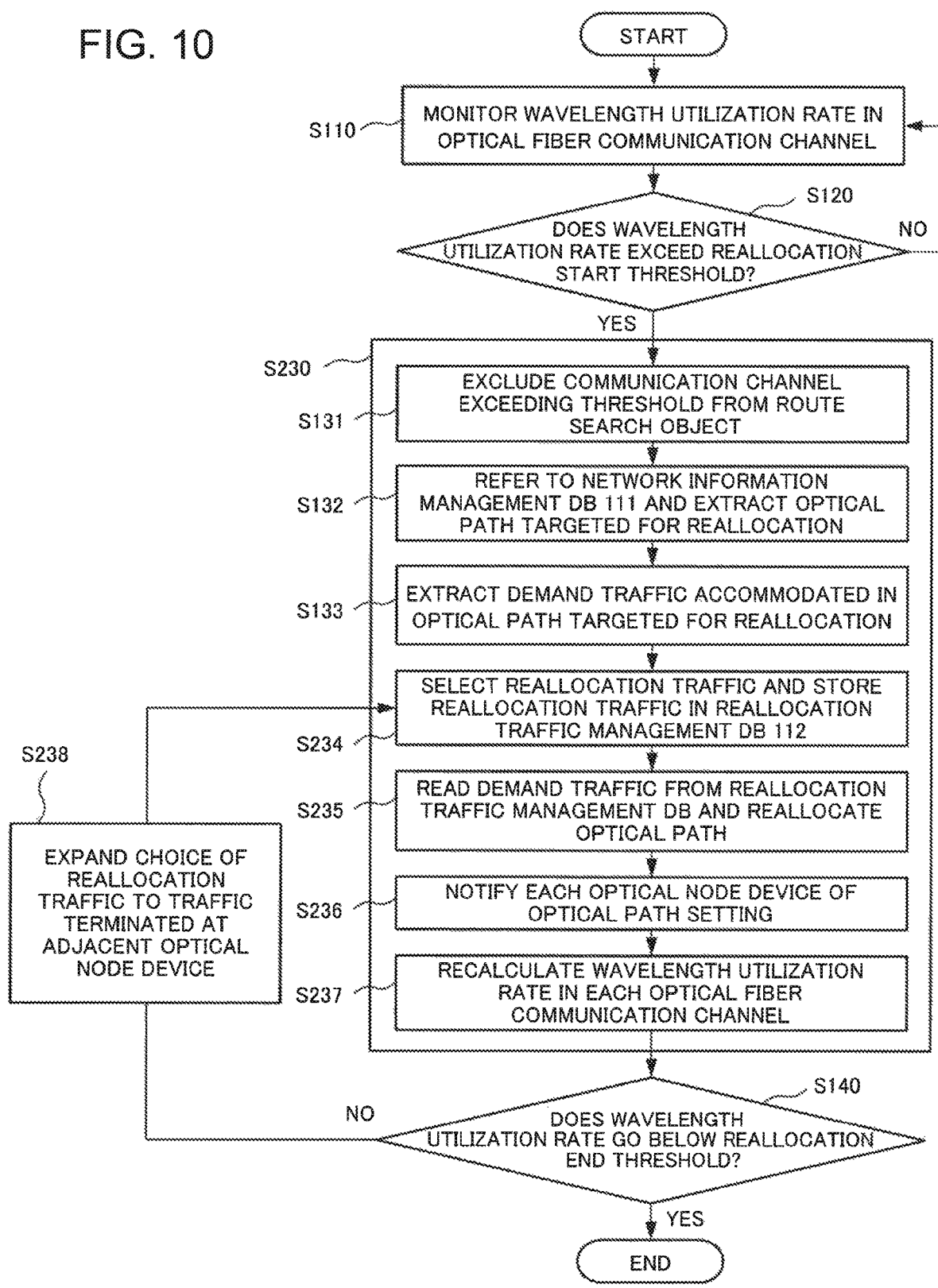
FIG. 10 is a flowchart to explain the operation of an optical network controller according to the third example embodiment of the present invention.

Next, the operation of the optical network controller 101 according to the present example embodiment will be described. FIG. 10 is a flowchart to explain the operation of the optical network controller 101 according to the present example embodiment.

The wavelength utilization rate calculation means 151 included in the optical network controller 101 monitors wavelength utilization rates in the optical fiber communication channels 301-1 to 301-6 constituting the optical network 200, regularly or at a timing when an optical path is allocated (step S110). The optical network controller 101 determines whether the wavelength utilization rate in the optical fiber communication channel exceeds the reallocation start threshold (step S120). If the wavelength utilization rate in the optical fiber communication channel exceeds the reallocation start threshold (step S120/YES), the optical network controller 101 implements a reallocation process of demand traffic (step S230).

The reallocation process of demand traffic (step S230) is implemented by the following procedure.

A route mask means 141 masks an optical fiber communication channel that exceeds the reallocation start threshold, and excludes it from the route search object (step S131). Next, referring to the network information management database (DB) 111, an optical path targeted for reallocation is extracted that has been allocated to the optical fiber communication channel excluded from the route search object (step S132). The traffic destination reference means 152 extracts the demand traffic accommodated in the optical path targeted for reallocation (step S133). The operation mentioned so far is similar to that of the optical network controller 100 according to the second example embodiment.

As the communication distance of an optical path becomes longer, it is preferable to exclude the optical path from an object to be reallocated in light of latency or power consumption. Accordingly, the traffic destination reference means 152 selects demand traffic to be reallocated from extracted demand traffic based on destination information. That is to say, the traffic destination reference means 152 selects demand traffic that is terminated at an optical node device serving as a connection source of a masked optical fiber communication channel, and stores the selected demand traffic in the reallocation traffic management database (DB) 112 (step S234). In this case, the destination information is information on a destination at which the demand traffic is terminated.

The optical path design means 130 reads the demand traffic from the reallocation traffic management database (DB) 112 and reallocates an optical path to accommodate the selected demand traffic (step S235). As a reallocation order in this case, a first-come and first-served basis can be used. The present example embodiment is not limited to this. A preprocessing to rearrange the reallocation order appropriately may be performed depending on a physical route length, the number of hops of a physical route, the quality of a physical route, a frequency utilization efficiency of an optical path, traffic priority, and the like.

Notice of the optical path reallocation design results is given from the optical network setting notification means 160 to each optical node device 300 thorough the optical node device setting notification means 310 included in each optical node device 300, and the optical path reallocation design results are reflected (step S236).

After the above-mentioned optical path reallocation setting is reflected, the wavelength utilization rate calculation means 151 calculates again a wavelength utilization rate in each optical fiber communication channel (step S237). It is determined whether the wavelength utilization rate in each optical fiber communication channel goes below the reallocation end threshold (step S140). The reallocation end threshold can be set in advance by a network operator and the like of telecommunications carriers, for example.

If the wavelength utilization rate in each optical fiber communication channel does not go below the reallocation end threshold (step S140/NO), the choice of reallocation traffic is expanded to traffic that is terminated at an adjacent optical node device (step S238). Then the demand traffic without overlapping is selected again, and the selected demand traffic is additionally stored in the reallocation traffic management database (DB) 112 (step S234).

Subsequently, the processes from step S234 to step S238 are performed repeatedly. If the wavelength utilization rate goes below the reallocation end threshold (step S140/YES), the reallocation process of the optical path is finished.

The demand traffic to be reallocated may be selected with respect to each number of hops of a reallocation optical path.

Figure 11:
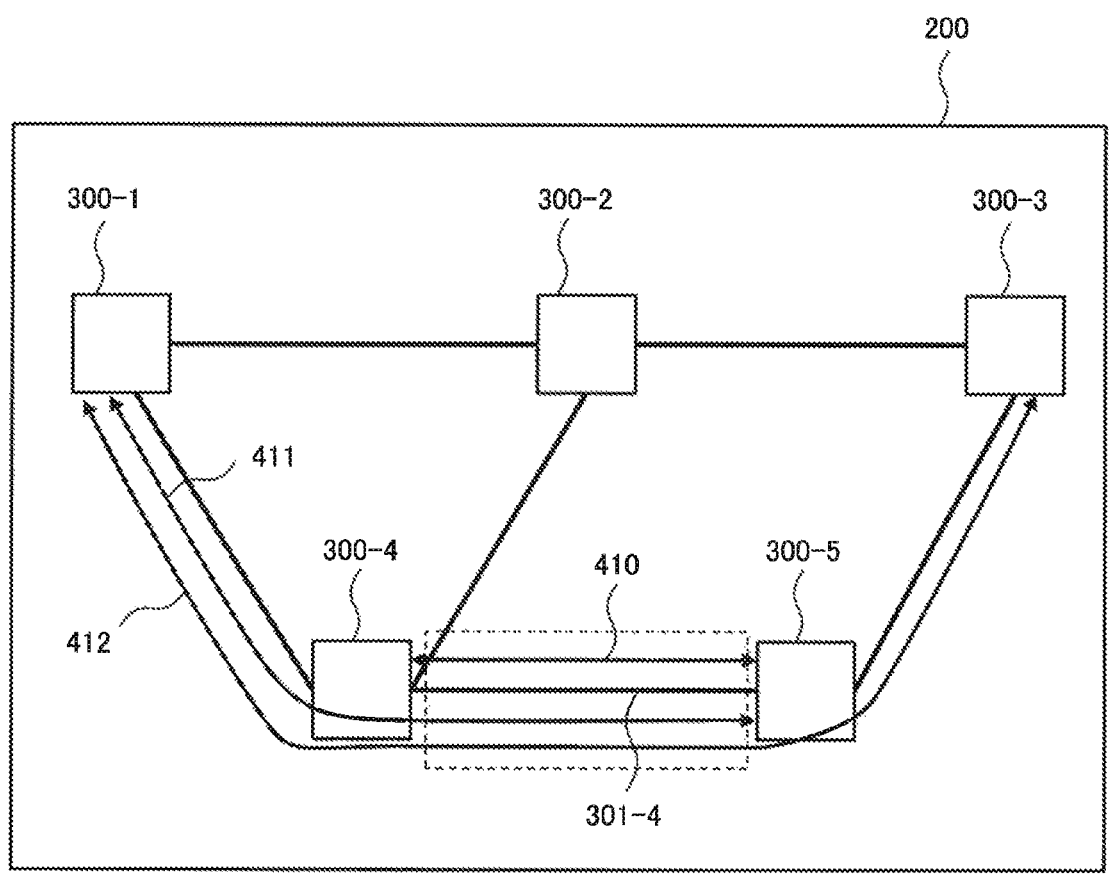
FIG. 11 is a diagram to explain the operation of an optical network controller according to the third example embodiment of the present invention, and a diagram to explain the operation to select demand traffic to be reallocated.

Next, the operation for the optical network controller 101 to select demand traffic to be reallocated will be described specifically using the case illustrated in FIG. 11 as an example. The wavelength utilization rate calculation means 151 detects the fact that the wavelength utilization rate in the optical fiber communication channel 301-4 exceeds the reallocation start threshold, and then the route mask means 141 masks the optical fiber communication channel 301-4 and excludes it from the route search object. The traffic destination reference means 152 extracts demand traffic accommodated in an optical path targeted for reallocation.

The optical path design means 130, first, selects, as an object to be reallocated, demand traffic 410 that is accommodated in an optical path terminated at the optical node device 300-4 and the optical node device 300-5 serving as a connection source of the optical fiber communication channel 301-4, from among the extracted demand traffic. After reallocating the demand traffic 410, if the wavelength utilization rate in the optical fiber communication channel 301-4 exceeds the reallocation end threshold (step S140/NO of FIG. 10), demand traffic 411 is then selected as an object to be reallocated (step S238).

Checking the wavelength utilization rate in the optical fiber communication channel 301-4 again, if it still exceeds the reallocation end threshold (step S140/NO of FIG. 10), demand traffic 412 is additionally selected as an object to be reallocated. The above-described procedures are repeated, which implements the reallocation of demand traffic.

In order to avoid the occurrence of communication interruption due to optical path reallocation, an optical path with higher priority may be excluded from the object to be reallocated even though the wavelength utilization rate exceeds the threshold. In this case, only an optical path with the priority below a constant value can be extracted from the network information management database (DB) 111, and it can be used as an object to be reallocated. The priority of the optical path can be determined by a network operator of telecommunications carriers, for example.

Particularly, with respect to demand traffic for which instantaneous interruption of communication is not permitted, it is possible to achieve the reallocation of an optical path without instantaneous interruption by performing the process of deleting an original optical path after a reallocation optical path is established, a so-called Make before Break process.

The above-mentioned operation of the optical network controller 101 makes it possible to untie tight conditions of available wavelengths in the optical fiber communication channel.

As mentioned above, the optical network controller 101 according to the present example embodiment performs the reallocation preferentially for a short distance path that is terminated by one hop. Consequently, it is possible to minimize a detour of an optical path associated with the reallocation. Furthermore, it is possible to reduce an allocation change of an optical path for long distance communication that it is preferable to exclude from an object to be reallocated in light of latency or power consumption.

As a result, according to the optical network controller 101 of the present example embodiment, it is possible to re-optimize client signals to be concentrated and improve the accommodation efficiency of an optical path without increasing processing steps even though the elastic optical network scheme is used.

Because the switching process of an optical path is performed on only an optical path targeted for reallocation, it is possible to suppress minimally a risk that a communication interruption occurs during the process. That is to say, it is possible to improve network utilization efficiency at high speed without detracting from reliability of the network.

Fourth Example Embodiment

Figure 12:
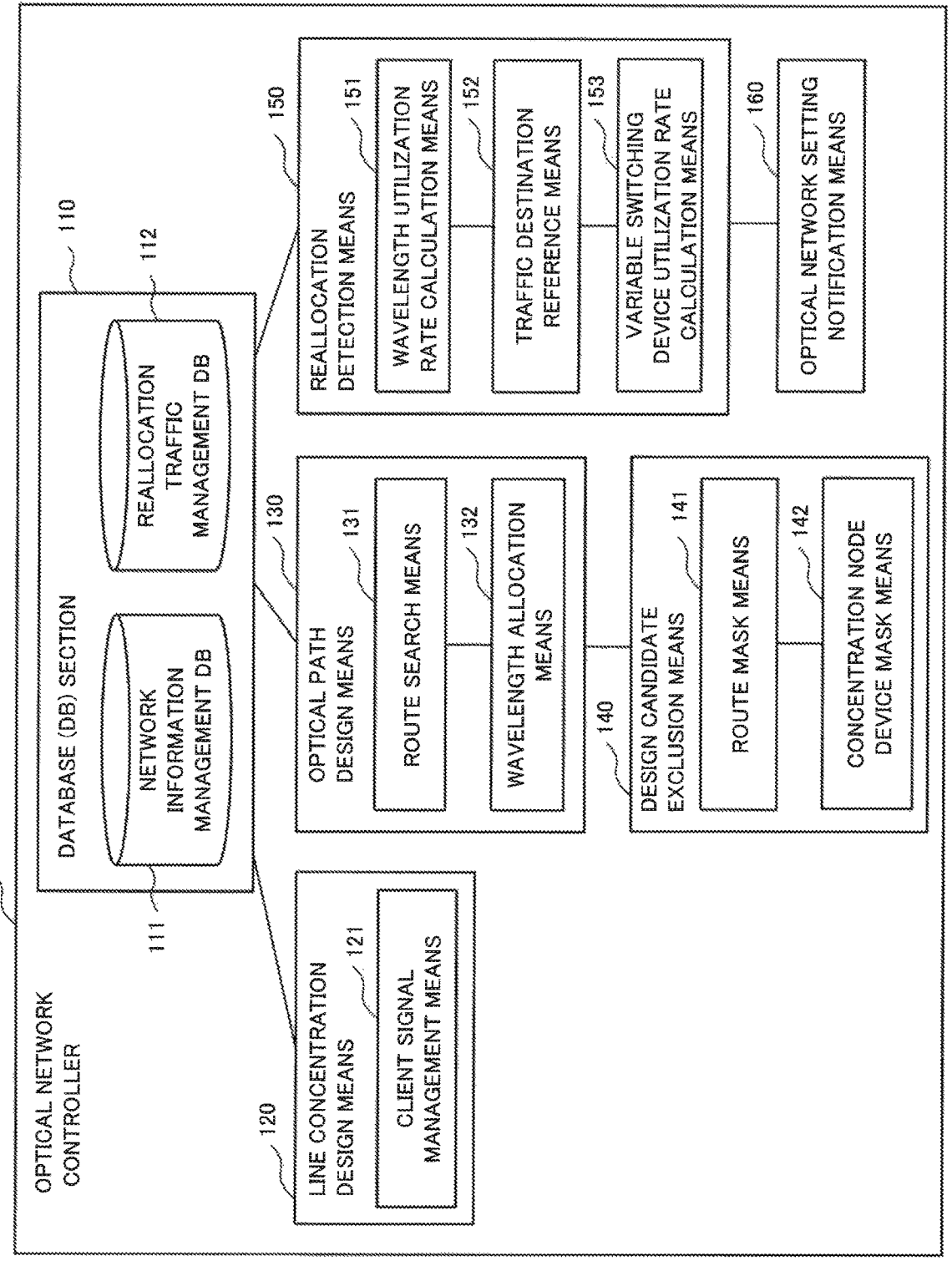
FIG. 12 is a block diagram illustrating a configuration of an optical network controller according to a fourth example embodiment of the present invention.

Next, a fourth example embodiment of the present invention will be described. FIG. 12 illustrates a configuration of an optical network controller 102 according to the present example embodiment.

The optical network controller 102 includes the database section 110, the line concentration design means (the concentration design section) 120, the optical path design means (the optical path design section) 130, the design candidate exclusion means (the design candidate exclusion section) 140, the reallocation detection means (the reallocation detection section) 150, and the optical network setting notification means (the optical network setting notification) 160. The database (DB) section 110 includes the network information management database (DB) 111 and the reallocation traffic management database (DB) 112. The above-described configurations are similar to those of the optical network controller 101 according to the third example embodiment.

The design candidate exclusion means 140 included in the optical network controller 102 according to the present example embodiment includes a concentration node device mask means 142 in addition to the route mask means 141. The reallocation detection means 150 according to the present example embodiment includes a variable switching device utilization rate calculation means 153 in addition to the wavelength utilization rate calculation means 151 and the traffic destination reference means 152.

Figure 13:
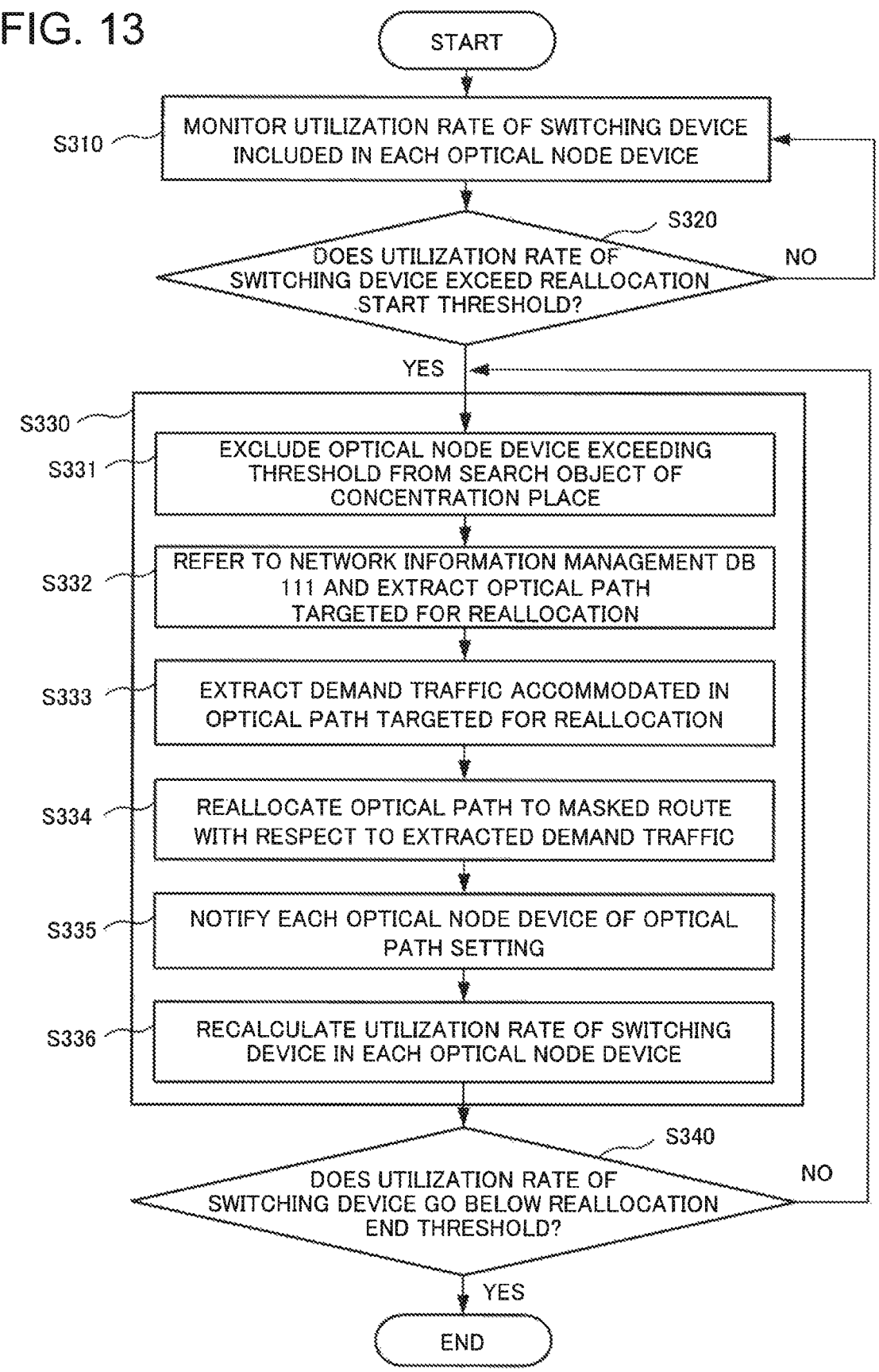
FIG. 13 is a flowchart to explain the operation of an optical network controller according to the fourth example embodiment of the present invention.

Next, the operation of the optical network controller 102 according to the present example embodiment will be described. FIG. 13 is a flowchart to explain the operation of the optical network controller 102 according to the present example embodiment.

The variable switching device utilization rate calculation means 153 included in the optical network controller 102 monitors the utilization rates of the variable small-granularity switching device 332 and the variable large-granularity switching device 342 that are included in the optical node device constituting the optical network 200 (step S310). The monitoring can be performed regularly or at a timing when an optical path is allocated.

If the variable small-granularity switching device 332 in particular, of the variable small-granularity switching device 332 and the variable large-granularity switching device 342, increases in utilization rate and becomes a high-load state, there arises the problem that a processing delay increases. The optical network controller 102 according to the present example embodiment, however, is configured to perform the reallocation of demand traffic when the utilization rate of the variable small-granularity switching device 332 exceeds the reallocation start threshold, as will be described below. Therefore, it is possible to design a network in which a load to the variable small-granularity switching device 332 is reduced. The reallocation start threshold can be set in advance by a network operator and the like of telecommunications carriers, for example.

The optical network controller 102 determines whether the utilization rate of at least one of the variable small-granularity switching device 332 and the variable large-granularity switching device 342 (hereinafter, simply referred to as "a switching device") exceeds the reallocation start threshold (step S320). If the utilization rate of the switching device exceeds the reallocation start threshold (step S320/YES), the optical network controller 102 implements a reallocation process of demand traffic (step S330).

The reallocation process of demand traffic (step S330) is implemented by the following procedure. The concentration node device mask means 142 masks an optical node device 300 with the utilization rate exceeding the reallocation start threshold, and excludes it from a search object as a line-concentration place of a client signal (step S331). Next, referring to the network information management database (DB) 111, an optical path to be terminated at a corresponding optical node device is extracted as an optical path targeted for reallocation (step S332). A path in which the corresponding optical node device serves as a destination of the demand traffic is excluded from an object to be reallocated. The traffic destination reference means 152 extracts the demand traffic accommodated in the optical path targeted for reallocation (step S333).

The client signal management means 121 changes the line-concentration place of the client signal to an adjacent optical node device without being masked. The optical path design means 130 performs a calculation to reallocate an optical path to a route where the optical node device with the reallocation start threshold being exceeded is masked and excluded, with respect to the extracted demand traffic (step S334).

Based on the above-mentioned calculation results, an optical path is excluded of which the number of occupied wavelength slots will increase, and then reallocation is performed. The reallocation can be performed on a first-come-first-served basis. The sequence is not limited to this, and the preprocessing to rearrange appropriately the reallocation order may be implemented depending on a physical route length, the number of hops of a physical route, the quality of a physical route, a frequency usage efficiency of an optical path, traffic priority and the like.

The reallocation design results of the optical path are sent from the optical network setting notification means 160 to each optical node device 300 through the optical node device setting notification means 310 included in each optical node device 300, and the results are reflected (step S335).

After the above-mentioned optical path reallocation setting is reflected, the variable switching device utilization rate calculation means 153 calculates again the utilization rate of the switching device, for example, the variable small-granularity switching device 332, included in each optical node device 300 (step S336). It is determined whether the utilization rate of each switching device goes below the reallocation end threshold (step S340). If the utilization rate of each switching device does not go below the reallocation end threshold (step S340/NO), the reallocation process (step S330) is performed repeatedly. If the utilization rate goes below the reallocation end threshold (step S340/YES), the reallocation process of the optical path is finished. The reallocation end threshold can be set in advance by a network operator and the like of telecommunications carriers, for example.

With an increase in the demand traffic volume accommodated in the entire optical network, a proportion of switching devices exceeding the reallocation start threshold increases. This causes many more line-concentration places of the client signal to be excluded from the route search object in step S331; consequently, it is likely to fail in the route search. In this case, the reallocation start threshold and the reallocation end threshold can be set again depending on an average utilization rate of the switching devices in the entire optical network, for example. The reallocation start threshold is set again, which increases the number of switching devices to be route search objects; therefore, it is possible to improve a success rate of the route selection.

For an optical path requiring being always opened, such as an optical path with high priority, the utilization rate of the switching device may be used as a route search metric in failing in route search, and the optical path may be allocated to a route at which the utilization rate is minimized.

For an optical path with high priority, in order to avoid disruption of communications due to optical path reallocation, the optical path with high priority may be excluded from an object to be reallocated even though the utilization rate of the switching device included in an optical node device to be terminated exceeds the threshold. Particularly, with respect to demand traffic for which instantaneous interruption of communication is not permitted, it is possible to achieve the reallocation of an optical path without instantaneous interruption by performing the process of deleting an original optical path after a reallocation optical path is established, a so-called Make before Break process.

The above-mentioned operation of the optical network controller 102 makes it possible to reduce the load on the switching device included in the optical node device 300. In particular, reducing the load on the variable small-granularity switching device makes it possible to keep a processing delay low.

As mentioned above, the optical network controller 102 according to the present example embodiment excludes an optical path of which the number of occupied wavelength slots increases due to the reallocation and then performs optical path reallocation. That is to say, the optical network controller 102 performs the re-optimization of optical path allocation with respect to only an optical path that enables the utilization efficiency of the optical network to improve. This makes it possible to reduce processing time and processing steps required for the re-optimization of the optical path allocation.

As a result, it is possible to re-optimize client signals to be concentrated and improve the accommodation efficiency of an optical path without increasing processing steps even though the elastic optical network scheme is used.

Because the switching process of an optical path is performed on only an optical path targeted for reallocation, it is possible to suppress minimally a risk that a communication interruption occurs during the process. That is to say, it is possible to improve network utilization efficiency at high speed without detracting from reliability of the network.

In addition, because it is possible to disperse optical node devices that concentrate demand traffic, the impact when a failure occurs can be reduced.

Fifth Example Embodiment

Figure 14:
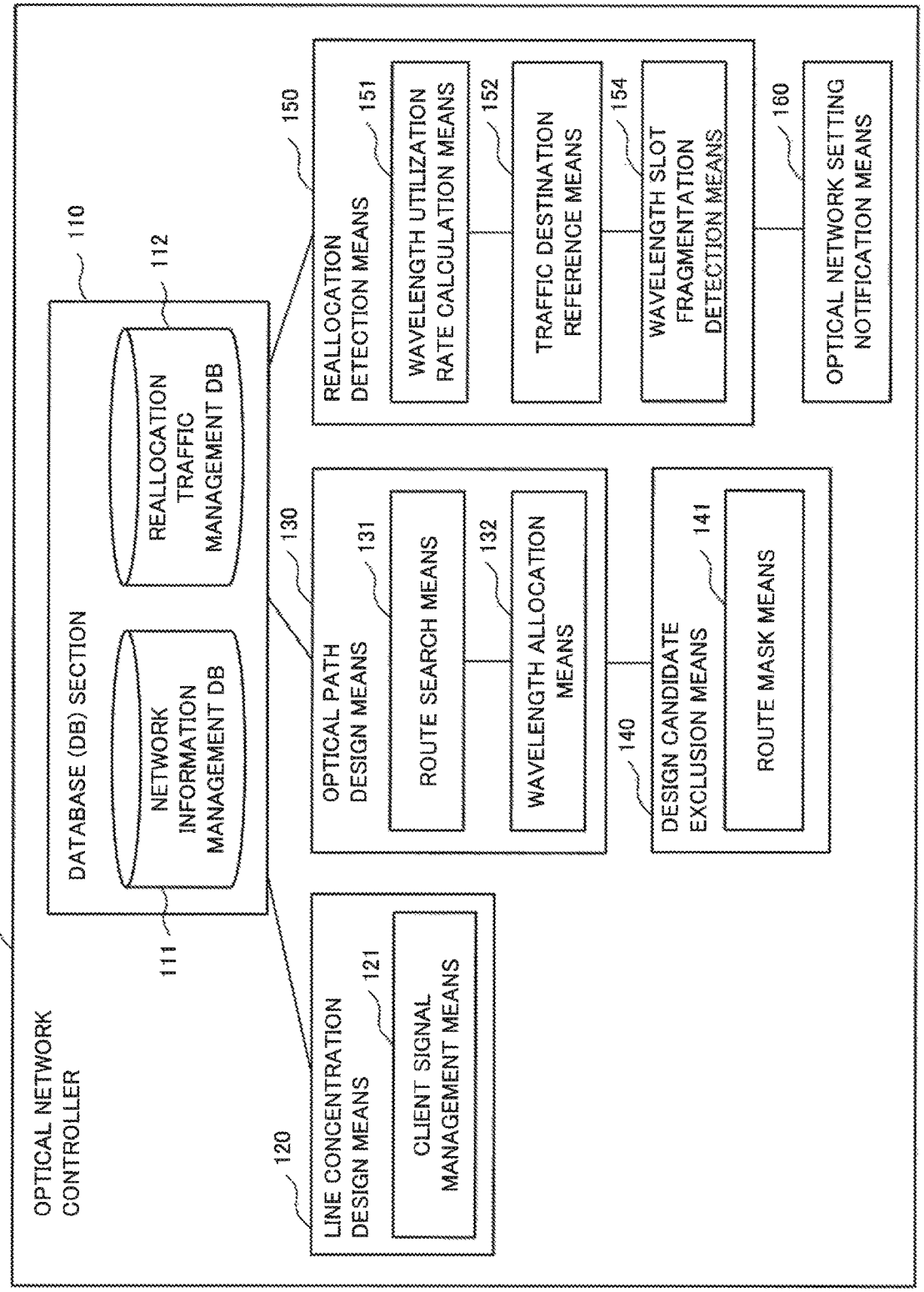
FIG. 14 is a block diagram illustrating a configuration of an optical network controller according to a fifth example embodiment of the present invention.

Next, a fifth example embodiment of the present invention will be described. FIG. 14 illustrates a configuration of an optical network controller 103 according to the present example embodiment.

The optical network controller 103 includes the database section 110, the line concentration design means (the concentration design section) 120, the optical path design means (the optical path design section) 130, the design candidate exclusion means (the design candidate exclusion section) 140, the reallocation detection means (the reallocation detection section) 150, and the optical network setting notification means (the optical network setting notification) 160. The database (DB) section 110 includes the network information management database (DB) 111 and the reallocation traffic management database (DB) 112. The above-described configurations are similar to those of the optical network controller 101 according to the third example embodiment.

The reallocation detection means 150 according to the present example embodiment includes a wavelength slot fragmentation detection means 154 in addition to the wavelength utilization rate calculation means 151 and the traffic destination reference means 152.

Next, the operation of the optical network controller 103 according to the present example embodiment will be described. FIG. 15 is a flowchart to explain the operation of the optical network controller 103 according to the present example embodiment.

The wavelength slot fragmentation detection means 154 included in the optical network controller 103 detects the allocation of wavelength slots in the optical fiber communication channels 301-1 to 301-6, regularly or at a timing when an optical path is allocated. Then an unused wavelength slot whose number of slots goes below the minimum number of occupied wavelength slots of an optical path (hereinafter, referred to as "wavelength fragmentation") is monitored (step S410). The number of unused wavelength slot regions that goes below the minimum number of occupied wavelength slots of an optical path in an optical fiber included in each optical fiber communication channel, is defined as "a fragmentation indicator", by which the wavelength fragmentation is quantitatively evaluated.

The optical network controller 103 determines whether the fragmentation indicator of the optical fiber communication channel exceeds the reallocation start threshold (step S420). The reallocation start threshold can be set in advance by a network operator and the like of telecommunications carriers, for example. If the fragmentation indicator of the optical fiber communication channel exceeds the reallocation start threshold (step S420/YES), the optical network controller 103 performs a reallocation process of demand traffic (step S430).

Figure 16A:
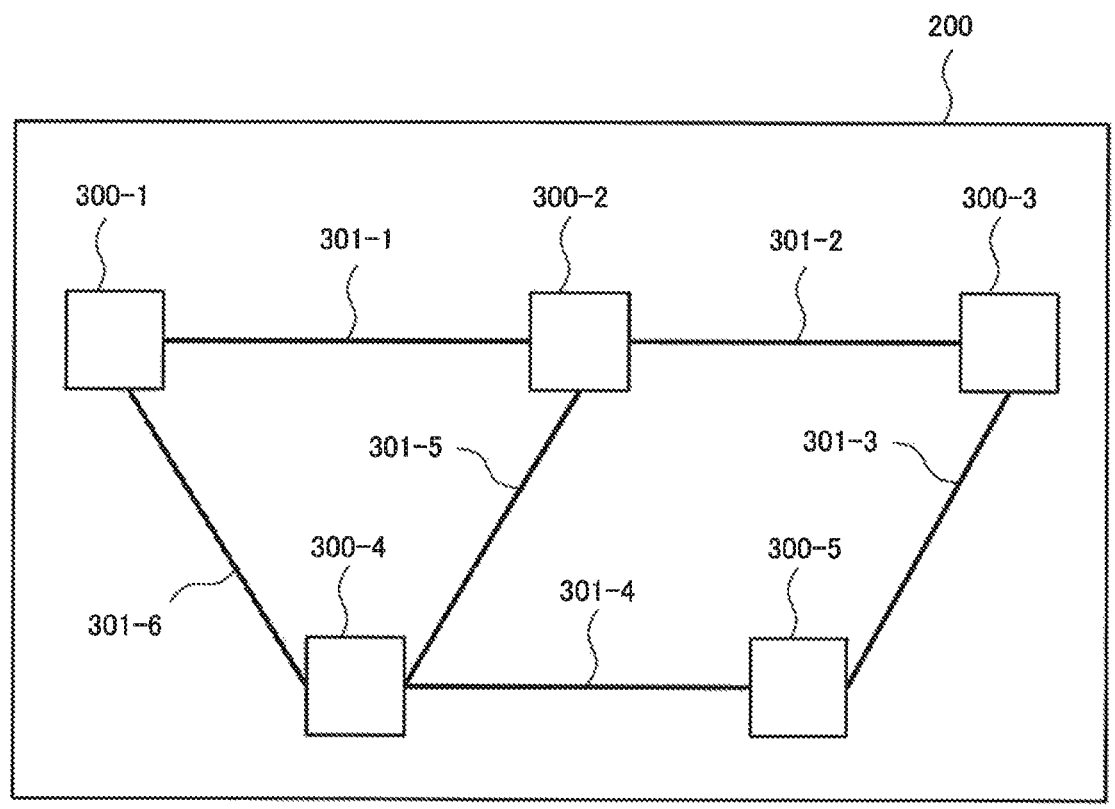
FIG. 16A is a diagram to explain the operation of an optical network controller according to the fifth example embodiment of the present invention, and a block diagram illustrating a configuration of an optical network used for explanation.

The fragmentation indicator of the optical fiber communication channel will be specifically described using FIG. 16A and FIG. 16B. The fragmentation indicator will be described using, as an example, an optical network 200 illustrated in FIG. 16A in which five optical node devices 300-1 to 300-5 are connected by six optical fiber communication channels 301-1 to 301-6.

In the example of an occupancy state of wavelength slots illustrated in FIG. 16B, the minimum number of occupied slots of an optical path is equal to "two", and the number of unused wavelength slots less than "two" is equal to "one". Consequently, an unused wavelength slot with the number of slots equal to "one" corresponds to the wavelength fragmentation. The fragmentation indicator is defined as the number of wavelength fragmentation regions in an optical fiber included in each optical fiber communication channel, as mentioned above. Accordingly, fragmentation indicators of the optical fiber communication channels 301-1 to 301-6 become respective values illustrated in the most right column of FIG. 16B. If the reallocation start threshold for the fragmentation indicator is set at "one", the optical network controller 103 performs the reallocation of demand traffic on the optical fiber communication channel 301-3 and the optical fiber communication channel 301-4.

As the fragmentation indicator, it is possible to use the number of slots of the wavelength fragmentation with respect to each optical fiber communication channel, the number of unallocated wavelength slots over a plurality of hops, or the number of wavelength slot regions. In addition, an inverse of the average value of frequency distribution regarding the number of unused wavelength slots in the optical fiber communication channel or an inverse of the most frequent value may be defined as the fragmentation indicator.

The reallocation process of demand traffic (step S430) is implemented by the following procedure.

The route mask means 141 masks an optical fiber communication channel that exceeds the reallocation start threshold, and excludes it from a route search object (step S431). Next, referring to the network information management database (DB) 111, an optical path is extracted that has been allocated to the optical fiber communication channel excluded from the route search object (step S432). The extracted optical path is called an "optical path targeted for reallocation".

The traffic destination reference means 152 extracts the demand traffic accommodated in the optical path targeted for reallocation (step S433). The optical path design means 130 performs a calculation to reallocate an optical path to a route from which the optical fiber communication channel exceeding the reallocation start threshold is masked and excluded, with respect to the extracted demand traffic (step S434).

Based on the above-mentioned calculation results, an optical path is excluded of which the number of occupied wavelength slots will increase, and then reallocation is performed. The reallocation can be performed on a first-come-first-served basis. The sequence is not limited to this, and the preprocessing to rearrange appropriately the reallocation order may be implemented depending on a physical route length, the number of hops of a physical route, the quality of a physical route, a frequency usage efficiency of an optical path, traffic priority and the like.

The reallocation design results of the optical path are sent from the optical network setting notification means 160 to each optical node device 300 through the optical node device setting notification means 310 included in each optical node device 300, and the results are reflected (step S435).

After the optical path reallocation setting is reflected, the wavelength slot fragmentation detection means 154 calculates again the fragmentation indicator of each optical fiber communication channel (step S436). It is determined whether the fragmentation indicator of each optical fiber communication channel goes below the reallocation end threshold (step S440). If the fragmentation indicator of each optical fiber communication channel does not go below the reallocation end threshold (step S440/NO), the reallocation process (step S430) is performed repeatedly. If the fragmentation indicator goes below the reallocation end threshold (step S440/YES), the reallocation process of the optical path is finished. The reallocation end threshold can be set in advance by a network operator and the like of telecommunications carriers, for example.

For an optical path with high priority, in order to avoid disruption of communications due to optical path reallocation, the optical path with high priority may be excluded from an object to be reallocated even though the fragmentation indicator exceeds the threshold. In this case, it is only necessary to extract only an optical path with priority below a constant value from the network information management database (DB) 111 and use it as an object to be reallocated. The priority of the optical path can be determined by a network operator of telecommunications carriers, for example.

The above-mentioned operation of the optical network controller 103 makes it possible to untie the wavelength fragmentation occurring in the optical fiber communication channel.

As mentioned above, the optical network controller 103 according to the present example embodiment excludes an optical path of which the number of occupied wavelength slots increases due to the reallocation and then performs optical path reallocation. This makes it possible to reduce processing time and processing steps required for the re-optimization of the optical path allocation.

As a result, it is possible to re-optimize client signals to be concentrated and improve the accommodation efficiency of an optical path without increasing processing steps even though the elastic optical network scheme is used.

Because the switching process of an optical path is performed on only an optical path targeted for reallocation, it is possible to suppress minimally a risk that a communication interruption occurs during the process. That is to say, it is possible to improve network utilization efficiency at high speed without detracting from reliability of the network.

According to the above-mentioned each example embodiment, it is possible to manage to obtain an allocable wavelength slot by performing re-optimization of wavelength resources on existing operational optical paths.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2016-025100, filed on Feb. 12, 2016, the disclosure of which is incorporated herein in its entirety by reference.

REFERENCE SIGNS LIST 10, 100, 101, 102, 103 optical network controller
11, 150 reallocation detection means
12, 140 design-candidate exclusion means
13, 130 optical path design means
14 traffic reference means
15, 120 line concentration design means
110 database section
111 network information management database (DB)
112 reallocation traffic management database (DB)
121 client signal management means
131 route search means
132 wavelength allocation means
140 design-candidate exclusion means
141 route mask means
142 concentration node device mask means
150 reallocation detection means
151 wavelength utilization rate calculation means
152 traffic destination reference means
153 variable switching device utilization rate calculation means
154 wavelength slot fragmentation detection means
160 optical network setting notification means 200 optical network
300-1 to 5 optical node device
301-1 to 6 optical fiber communication channel
310 optical node device setting notification means
320 optical node device control means
321 line concentration control means
322 wavelength control means
323 route control means
330 client signal switching means
331-1 to 4 client device
332 variable small-granularity switching device
340 optical path switching means
341-1 and 2 variable optical transponder device
342 variable large-granularity switching device
400 demand traffic
401 alternative route
402-1, 402-2 optical path
1000 optical communication system

The invention claimed is:

1. An optical network controller, comprising:
a reallocation detection section configured to monitor an operation status of at least one of an optical communication channel and an optical node device that constitute an optical network, and determine, based on the operation status, whether or not to reallocate a client signal accommodated in an optical path set in the optical network;
a design-candidate exclusion section configured to designate, as a design exclusion object, at least one of the optical communication channel and the optical node device that are associated with an optical path targeted for reallocation that accommodates the client signal that the reallocation detection section has determined to reallocate;
an optical path design section configured to determine an alternative route for the optical path targeted for reallocation from among routes with the exception of the design exclusion object;
a traffic reference section configured to extract demand traffic accommodated in the optical path targeted for reallocation, and determine the client signal to be reaccommodated in an optical path on the alternative route based on extracted demand traffic; and
a line concentration design section configured to constitute line-concentration traffic in which traffic having been allocated to the alternative route and the demand traffic are concentrated,
wherein the traffic reference section determines a reallocation optical path in which an optical path candidate with number of occupied wavelength slots increasing due to reallocation is excluded from optical path candidates on the alternative route, and
wherein the optical path design section determines wavelength allocation of the reallocation optical path so as to accommodate the line-concentration traffic.

2. The optical network controller according to claim 1, wherein the reallocation detection section includes a wavelength utilization rate calculation section configured to monitor a wavelength utilization rate of the optical communication channel as the operation status.

3. The optical network controller according to claim 2, wherein the reallocation detection section includes a switching device utilization rate calculation section configured to monitor a utilization rate of a switching device included in the optical node device as the operation status.

4. The optical network controller according to claim 2, wherein the reallocation detection section includes a wavelength slot fragmentation detection section configured to monitor a fragmentation indicator regarding a wavelength slot in the optical communication channel as the operation status.

5. The optical network controller according to claim 2, wherein the traffic reference section selects the demand traffic to be reaccommodated based on destination information on the demand traffic.

6. The optical network controller according to claim 2, further comprising an optical network setting notification section configured to notify an optical node device of reallocation optical path information including information on the alternative route, wavelength allocation of the reallocation optical path, and a client signal constituting the line-concentration traffic.

7. The optical network controller according to claim 1, wherein the reallocation detection section includes a switching device utilization rate calculation section configured to monitor a utilization rate of a switching device included in the optical node device as the operation status.

8. The optical network controller according to claim 7, wherein the reallocation detection section includes a wavelength slot fragmentation detection section configured to monitor a fragmentation indicator regarding a wavelength slot in the optical communication channel as the operation status.

9. The optical network controller according to claim 7, wherein the traffic reference section selects the demand traffic to be reaccommodated based on destination information on the demand traffic.

10. The optical network controller according to claim 7, further comprising an optical network setting notification section configured to notify an optical node device of reallocation optical path information including information on the alternative route, wavelength allocation of the reallocation optical path, and a client signal constituting the line-concentration traffic.

11. The optical network controller according to claim 1, wherein the reallocation detection section includes a wavelength slot fragmentation detection section configured to monitor a fragmentation indicator regarding a wavelength slot in the optical communication channel as the operation status.

12. The optical network controller according to claim 11, wherein the traffic reference section selects the demand traffic to be reaccommodated based on destination information on the demand traffic.

13. The optical network controller according to claim 11, further comprising an optical network setting notification section configured to notify an optical node device of reallocation optical path information including information on the alternative route, wavelength allocation of the reallocation optical path, and a client signal constituting the line-concentration traffic.

14. The optical network controller according to claim 1, wherein the traffic reference section selects the demand traffic to be reaccommodated based on destination information on the demand traffic.

15. The optical network controller according to claim 14, wherein the destination information is information on a destination at which the demand traffic is terminated.

16. The optical network controller according to claim 14, further comprising an optical network setting notification section configured to notify an optical node device of reallocation optical path information including information on the alternative route, wavelength allocation of the reallocation optical path, and a client signal constituting the line-concentration traffic.

17. The optical network controller according to claim 1, further comprising an optical network setting notification section configured to notify an optical node device of reallocation optical path information including information on the alternative route, wavelength allocation of the reallocation optical path, and a client signal constituting the line-concentration traffic.

18. An optical node device, comprising:
an optical node device setting notification section configured to receive the reallocation optical path information from the optical network setting notification section included in the optical network controller according to claim 17;
a client signal switching section configured to concentrate a plurality of client signals;
an optical path switching section configured to send signal light having been modulated based on a client signal concentrated in the client signal switching section to an optical communication channel; and
an optical node device control section configured to control the client signal switching section and the optical path switching section based on the reallocation optical path information.

19. A method of setting an optical path, comprising:
monitoring an operation status of at least one of an optical communication channel and an optical node device that constitute an optical network, and determining, based on the operation status, whether or not to reallocate a client signal accommodated in an optical path set in the optical network;
designating, as a design exclusion object, at least one of the optical communication channel and the optical node device, if it is determined to reallocate the client signal, the optical communication channel and the optical node device being associated with an optical path targeted for reallocation to accommodate the client signal that it is determined to reallocate;
determining an alternative route for the optical path targeted for reallocation from among routes with the exception of the design exclusion object;
extracting demand traffic accommodated in the optical path targeted for reallocation;
determining the client signal to be reaccommodated in an optical path on the alternative route based on extracted demand traffic;
constituting line-concentration traffic in which traffic having been allocated to the alternative route and the demand traffic are concentrated;
determining a reallocation optical path in which an optical path candidate with number of occupied wavelength slots increasing due to reallocation is excluded from optical path candidates on the alternative route; and
determining wavelength allocation of the reallocation optical path so as to accommodate the line-concentration traffic.

20. A non-transitory computer-readable storage medium storing a program that, when executed, causes a computer to function as:
means for monitoring an operation status of at least one of an optical communication channel and an optical node device that constitute an optical network, and determining, based on the operation status, whether or not to reallocate a client signal accommodated in an optical path set in the optical network;
means for designating, as a design exclusion object, at least one of the optical communication channel and the optical node device that are associated with an optical path targeted for reallocation that accommodates the client signal that the reallocation detection means has determined to reallocate;
means for determining an alternative route for the optical path targeted for reallocation from among routes with the exception of the design exclusion object;
means for extracting demand traffic accommodated in the optical path targeted for reallocation;
means for determining the client signal to be reaccommodated in an optical path on the alternative route based on extracted demand traffic;
means for constituting line-concentration traffic in which traffic having been allocated to the alternative route and the demand traffic are concentrated,
means for determining a reallocation optical path in which an optical path candidate with number of occupied wavelength slots increasing due to reallocation is excluded from optical path candidates on the alternative route; and
means for determining wavelength allocation of the reallocation optical path so as to accommodate the line-concentration traffic.

* * * * *